(12) United States Patent
Green

(10) Patent No.: US 12,544,245 B2
(45) Date of Patent: Feb. 10, 2026

(54) STENT DELIVERY HANDLE ASSEMBLY

(71) Applicant: Abbott Cardiovascular Systems Inc., Santa Clara, CA (US)

(72) Inventor: Michael L. Green, Pleasanton, CA (US)

(73) Assignee: Abbott Cardiovascular Systems Inc., Santa Clara, CA (US)

( * ) Notice: Subject to any disclaimer, the term of this patent is extended or adjusted under 35 U.S.C. 154(b) by 955 days.

(21) Appl. No.: 17/592,273

(22) Filed: Feb. 3, 2022

(65) Prior Publication Data
US 2023/0240871 A1 Aug. 3, 2023

(51) Int. Cl.
*A61F 2/95* (2013.01)
*A61F 2/844* (2013.01)
*A61F 2/966* (2013.01)

(52) U.S. Cl.
CPC ............ *A61F 2/9517* (2020.05); *A61F 2/966* (2013.01); *A61F 2/844* (2013.01); *A61F 2002/9511* (2013.01); *A61F 2002/9528* (2013.01); *A61F 2002/9665* (2013.01)

(58) Field of Classification Search
CPC ........ A61F 2/9517; A61F 2/966; A61F 2/844; A61F 2002/9511; A61F 2002/9528; A61F 2002/9665; A61F 2/2427; A61F 2/2436
See application file for complete search history.

(56) References Cited

U.S. PATENT DOCUMENTS

| | | |
|---|---|---|
| 6,238,402 B1 | 5/2001 | Sullivan et al. |
| 6,736,839 B2 | 5/2004 | Cummings |
| 7,208,002 B2 | 4/2007 | Shelso |
| 7,387,640 B2 | 6/2008 | Cummings |
| 7,967,829 B2 | 6/2011 | Gunderson et al. |
| 7,976,574 B2 | 7/2011 | Papp |
| 8,128,676 B2 | 3/2012 | Cummings |
| 8,585,749 B2 | 11/2013 | Shelso |
| 8,628,562 B2 | 1/2014 | Cummings |
| 8,702,778 B2 | 4/2014 | Loewen |
| 8,753,384 B2 | 6/2014 | Leanna |
| 8,784,468 B2 | 7/2014 | Gerdts et al. |
| 8,834,550 B2 | 9/2014 | Leanna et al. |
| 8,876,881 B2 | 11/2014 | Sheldon et al. |
| 9,084,692 B2 | 7/2015 | Hacker et al. |
| 9,220,619 B2 | 12/2015 | Ramos et al. |
| 9,408,736 B2 | 8/2016 | Loewen |
| 9,724,223 B2 | 8/2017 | Dooley |
| 9,820,877 B2 | 11/2017 | Cummins |
| 9,931,232 B2 | 4/2018 | Gunderson et al. |

(Continued)

OTHER PUBLICATIONS

International Search Report, Apr. 5, 2023, 2 pages, from counterpart App. No. PCT/US2023/011063.

*Primary Examiner* — Jerrah Edwards
*Assistant Examiner* — Jose H. Trevino, III
(74) *Attorney, Agent, or Firm* — Fulwider Patton LLP

(57) ABSTRACT

A stent delivery catheter assembly for delivering and implanting a self-expanding stent in a body lumen includes a handle assembly for one handed use. The handle assembly has a mode selection for advancing, reversing and locking the stent delivery components. Rotation of a thumbwheel allows the physician to deploy and implant the self-expanding stent in the body lumen with control and precision by simultaneously pulling a sheath proximally and pushing a pusher member distally.

72 Claims, 29 Drawing Sheets

(56) References Cited

U.S. PATENT DOCUMENTS

| | | | |
|---|---|---|---|
| 9,974,679 B2 | 5/2018 | Ramos et al. | |
| 10,016,292 B2 | 7/2018 | Senness et al. | |
| 10,058,443 B2 | 8/2018 | Munsinger et al. | |
| 10,159,587 B2 | 12/2018 | Walsh | |
| 10,201,443 B2 | 2/2019 | Bueche et al. | |
| 10,201,445 B2 | 2/2019 | Weber et al. | |
| 10,441,449 B1 | 10/2019 | Longo et al. | |
| 10,667,907 B2 | 6/2020 | Klima et al. | |
| 10,849,747 B2 | 12/2020 | Morrissey et al. | |
| 10,881,542 B2 | 1/2021 | Harris | |
| 11,241,324 B2 | 2/2022 | Halbert et al. | |
| 2015/0297378 A1* | 10/2015 | Senness | A61F 2/966 623/1.11 |
| 2017/0333238 A1 | 11/2017 | Dooley | |

\* cited by examiner

STENT DELIVERY HANDLE ASSEMBLY

BACKGROUND

Disclosed herein are devices and methods for delivering a stent in a body vessel or in a non-body structure such as a polymer tube used for testing or demonstration.

Body vessels or certain non-body structures such as polymer tubes may be at least partially occluded. A stent can be inserted across a lesion or obstruction in order to restore patency to the vessel. Stents can also be used for other functions, such as trapping embolic material, increasing fluid flow, and the like.

Certain types of stents such as self-expanding stents are often deployed by push-pull catheter handles. Although simple, this design does not help the user to accurately deploy the stent. At least one component needs to move relative to the patient, often two components need to move relative to the patient. Two hands are often necessary to deploy the stent.

What is needed is a stent delivery handle that enables one handed deployment of self-expanding stents. It is use friendly for a controlled (proximal) retraction of a sheath while pushing a stent distally. The stent delivery handle does not need to move relative to the patient (may stay stationary). It may include a stabilizer to help maintain relative position to the patient. The stent delivering handle is reversible such that it may recover the stent prior to finishing the deployment.

SUMMARY OF THE INVENTION

In certain embodiments, a system for delivering a self-expanding stent comprises a self-expanding stent, a stent delivery catheter, and a handle. The stent has a radially reduced configuration and a radially expanded configuration. The stent has a proximal end, a distal end, and length between the proximal end and the distal end. The stent comprises a plurality of openings along the length. The stent delivery catheter comprises an elongate outer tubular member, an elongate inner tubular member, and a stent-engaging member. The outer tubular member has a proximal end and a distal end. The stent is contained in the radially reduced configuration within the distal end of the outer tubular member. The elongate inner tubular member has a proximal end and a distal end. The inner tubular member extends within the outer tubular member. The inner tubular member at least partially defines a guidewire lumen.

In one embodiment, a catheter assembly is used for delivering and implanting a self-expanding stent in a body lumen. A handle has a thumbwheel and a selector tab for selecting rotation of the thumbwheel. Rotation of the thumbwheel in a reverse direction is defined by the physician pushing their thumb along the top of the thumbwheel so that the top of the thumbwheel moves in a direction from the handle proximal end toward the handle distal end. Similarly, rotation of the thumbwheel in a forward direction is defined by the physician pulling their thumb along the top of the thumbwheel so that the top of the thumbwheel moves in a direction from the handle distal end toward the handle proximal end. A selector member is pivotally mounted inside of the thumbwheel and attached to the selector tab. A first ratchet member and a second ratchet member are pivotally mounted inside of the thumbwheel so that the selector member can be rotated to engage and disengage either or neither of the first ratchet member and the second ratchet member. Each of the first and second ratchet members have a first end, a second end, a cam surface, and a spring wire in the form of an elongated flexible rod. A sheath spool has a sheath wire wound thereon, a distal end of the sheath wire being attached to a sheath. A pusher spool has a pusher wire wound thereon, a distal end of the pusher wire being attached to a pusher member. A self-expanding stent is mounted inside a distal portion of the sheath and is positioned distally of the pusher member.

With the selector tab moved to a forward position on the handle, the selector member pivots to disengage the second ratchet member from the thumbwheel so that the thumbwheel can only rotate in a forward direction toward the proximal end of the handle, thereby simultaneously withdrawing the sheath proximally and pushing the pusher member distally and pushing the self-expanding stent distally to implant the self-expanding stent in the body lumen. More specifically, when the selector member pivots, the second end of the second ratchet member disengages from inner ridges on the thumbwheel. Simultaneously, the second end of the first ratchet member remains in contact with and engaged with the inner ridges on the thumbwheel so that the thumbwheel can only ratchet and rotate in the forward direction. In this position, the second spring wire on the second ratchet member is bent and flexed so that a spring force is created in the second spring wire. When the selector tab is moved from the forward position to a locked position, the selector member pivots to allow the second end of the second ratchet member to engage with the inner ridges of the thumbwheel and simultaneously reduces the spring force in the second spring wire so that the second spring wire nearly straightens and applies a spring bias in the second ratchet member to apply a continuous force maintaining the engagement of the second end of the second ratchet member with the inner ridges of the thumbwheel. The pusher spool, the sheath spool and the thumbwheel always rotate in the same direction. The pusher spool rotates in a forward direction when the thumbwheel is rotating in the forward direction. A distal end of the pusher wire is attached to the pusher member so that as the pusher spool rotates in the forward direction, the pusher wire unwinds from the pusher spool and advances distally to advance the pusher member distally and hence push the self-expanding stent distally. The pusher wire is wound around the pusher spool when assembled so that the pusher wire will unwind when the pusher spool rotates in a forward direction. The sheath spool rotates in a forward direction when the thumbwheel is rotating in the forward direction. A distal end of the sheath wire is attached to the sheath member so that as the sheath spool rotates in the forward direction, the sheath wire withdraws proximally to pull the sheath member proximally and hence deploy the self-expanding stent. A portion of the sheath wire is wound around the sheath spool when assembled so that the sheath wire will wind onto the sheath spool when the sheath spool rotates in a forward direction. The selector member has a first cam and a second cam so that when the selector tab is moved to the forward position, the selector member pivots so that the second cam engages a second cam surface on the second ratchet member to pivot the second ratchet member so that it disengages from the thumbwheel. A second end of the first ratchet member engages the inner ridges spaced along an inner circumferential surface of the thumbwheel. The second end engages the inner ridges of the thumbwheel so that the thumbwheel can only rotate in the forward direction.

In order to pull the self-expanding stent back into the sheath, the selector tab is moved to a reverse position, whereby the selector member pivots so that the first cam engages the first ratchet member to pivot and disengage from the thumbwheel. A second end of the second ratchet member engages inner ridges spaced along the inner circumferential surface of the thumbwheel so that the thumbwheel can only rotate in the reverse direction. Rotation of the thumbwheel in the reverse direction results in the sheath spool and pusher spool rotating in the reverse direction. This causes the sheath wire to be pushed distally to push the sheath distally over the stent and the pusher member to withdraw proximally to pull the self-expanding stent back into the sheath.

When the selector tab is in a locked position, the first cam and the second cam of the selector member do not engage the first ratchet member and the second ratchet member respectively so that the second end of the first ratchet member and the second end of the second ratchet member each engage the inner ridges spaced along the inner circumferential surface of the thumbwheel and thereby prevent the thumbwheel from rotating.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

DETAILED DESCRIPTION OF THE PREFERRED EMBODIMENTS

In certain embodiments, a system for delivering a self-expanding stent comprises a self-expanding stent, a stent delivery catheter, and a handle. The self-expanding stent is well known in the art and has a radially reduced configuration and a radially expanded configuration. The stent has a proximal end, a distal end, and length between the proximal end and the distal end. The stent comprises a plurality of openings along the length.

Figure 1:
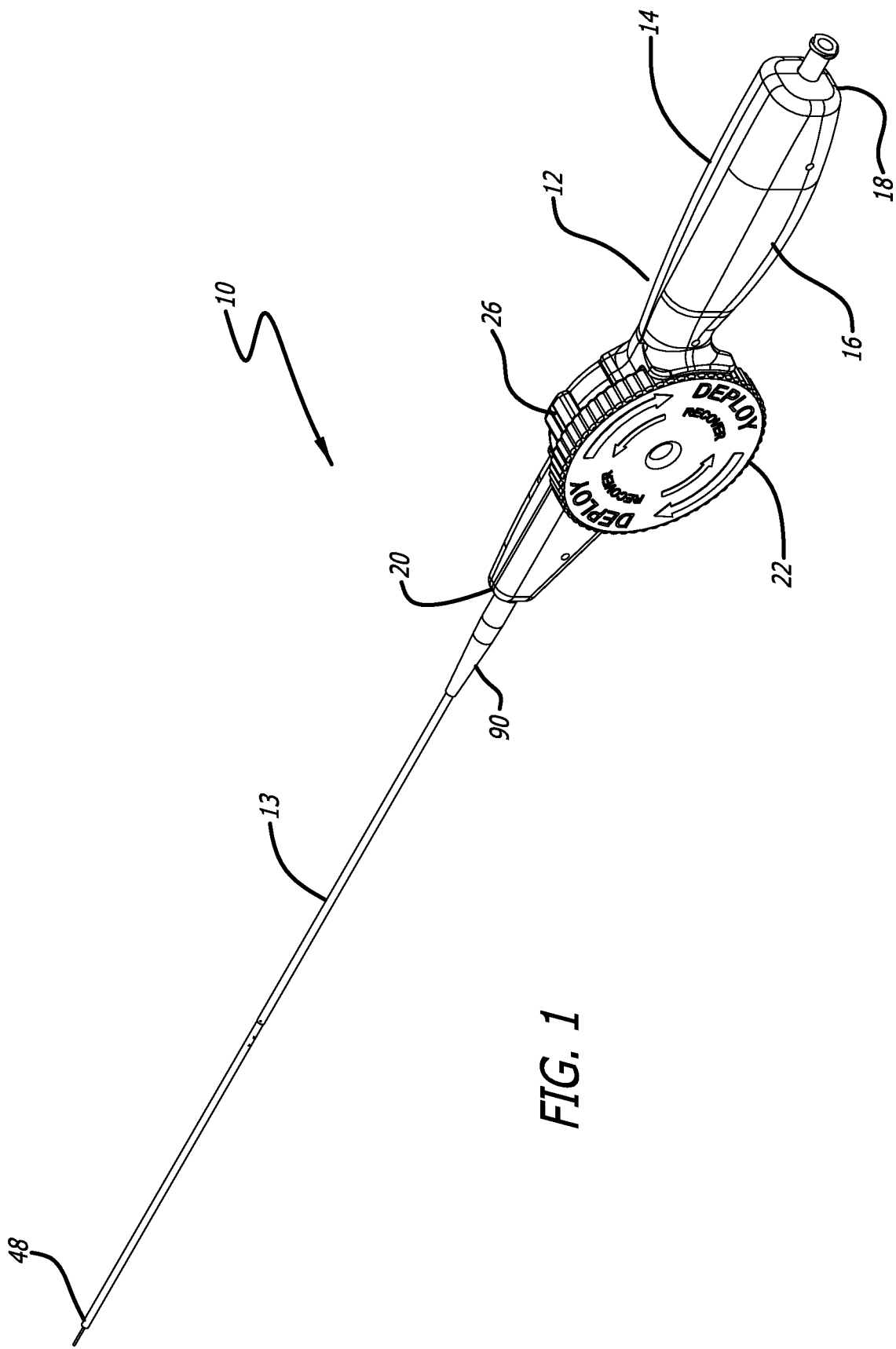
FIG. 1 is a perspective view depicting a catheter assembly for delivering a self-expanding stent.
Figure 2:
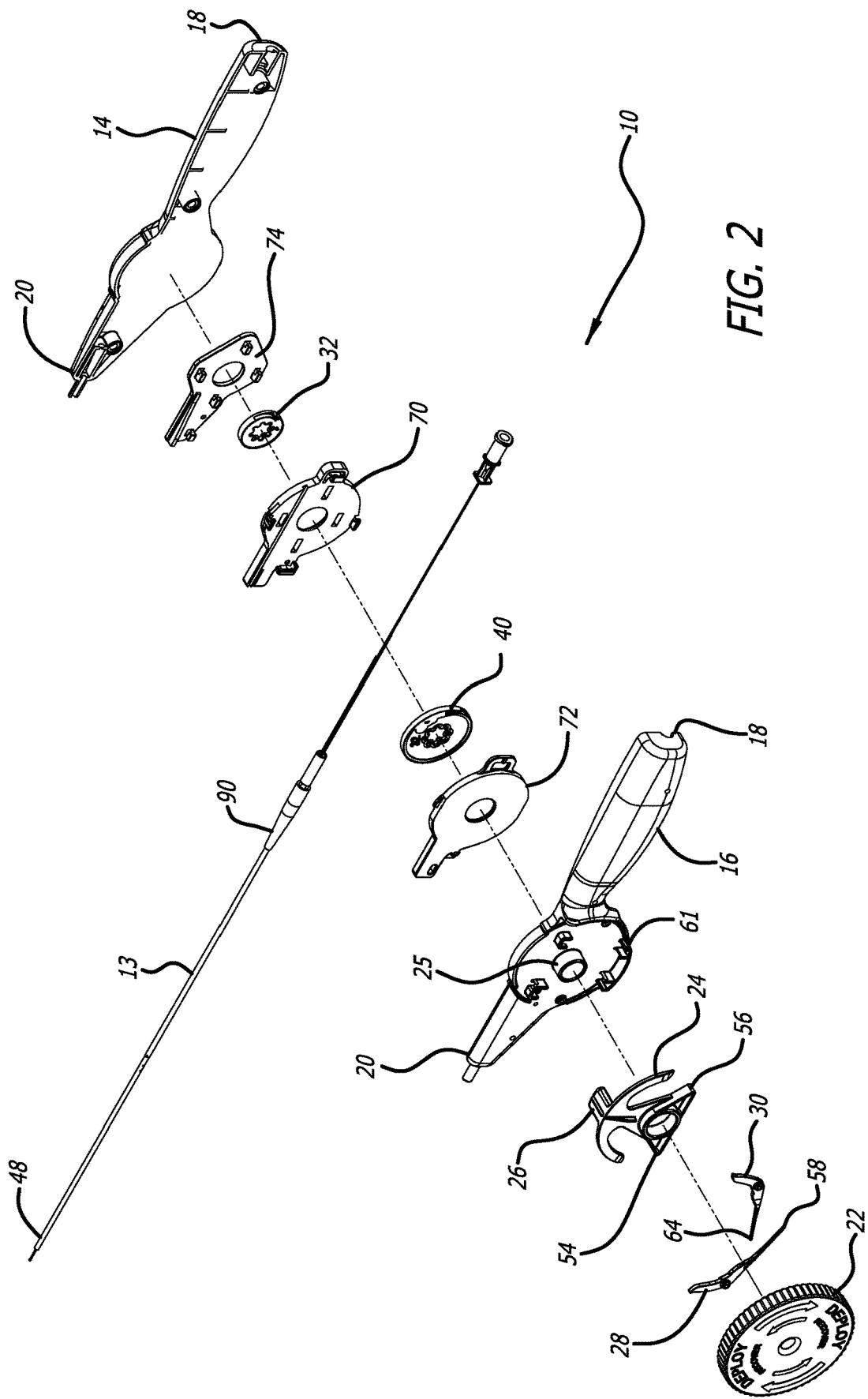
FIG. 2 is a exploded view depicting the catheter assembly.
Figure 3:
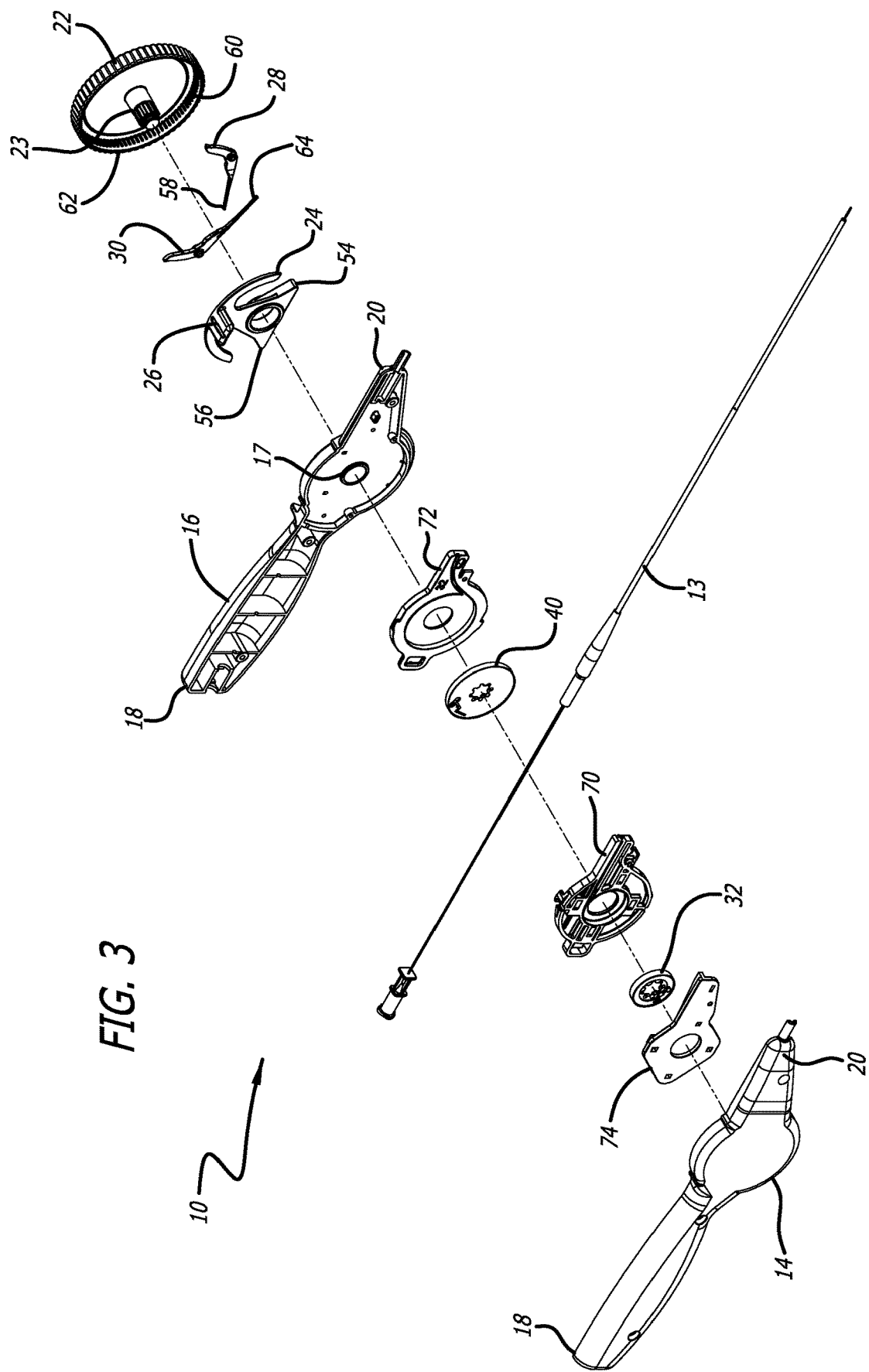
FIG. 3 is an exploded view depicting the catheter assembly.
Figure 4A:
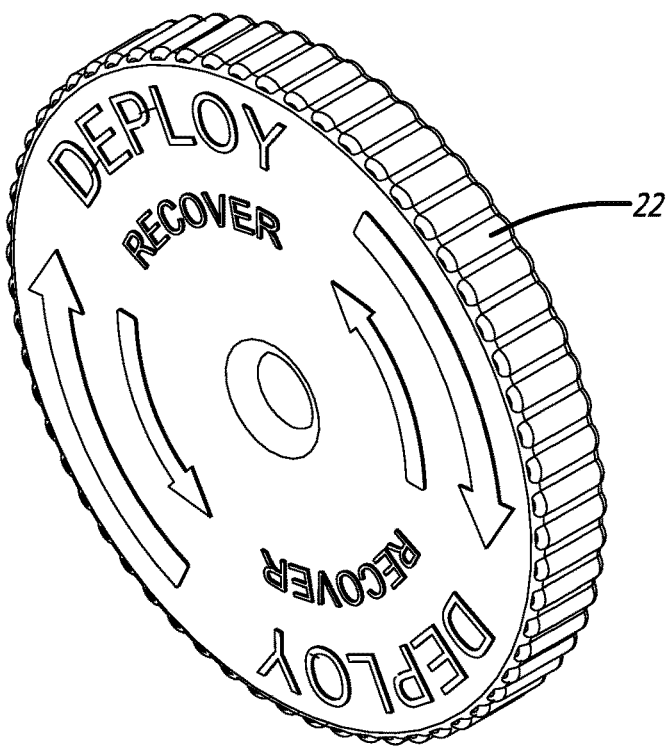
FIGS. 4A and 4B are side perspective views depicting both sides of a thumbwheel.
Figure 4B:
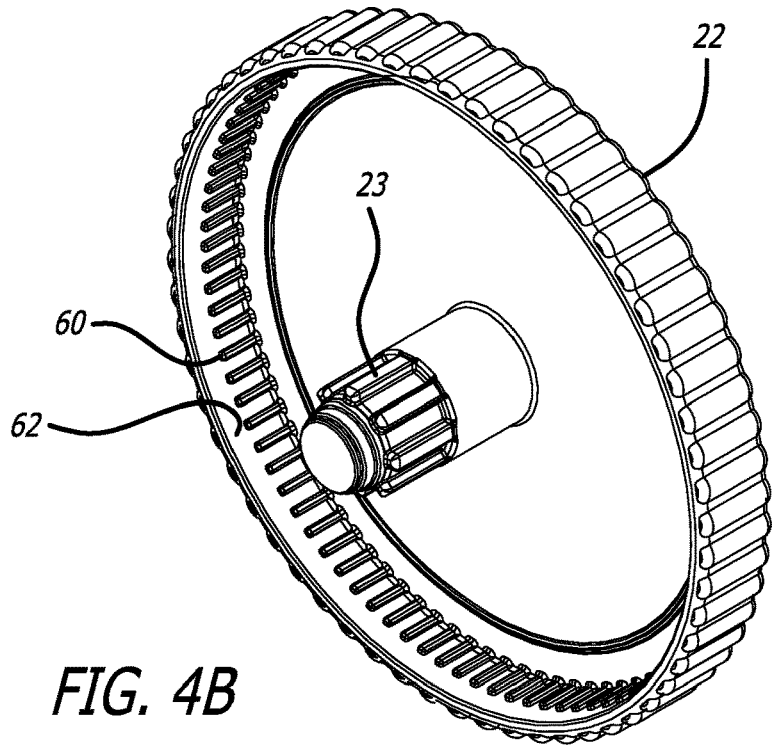
Figure 5A:
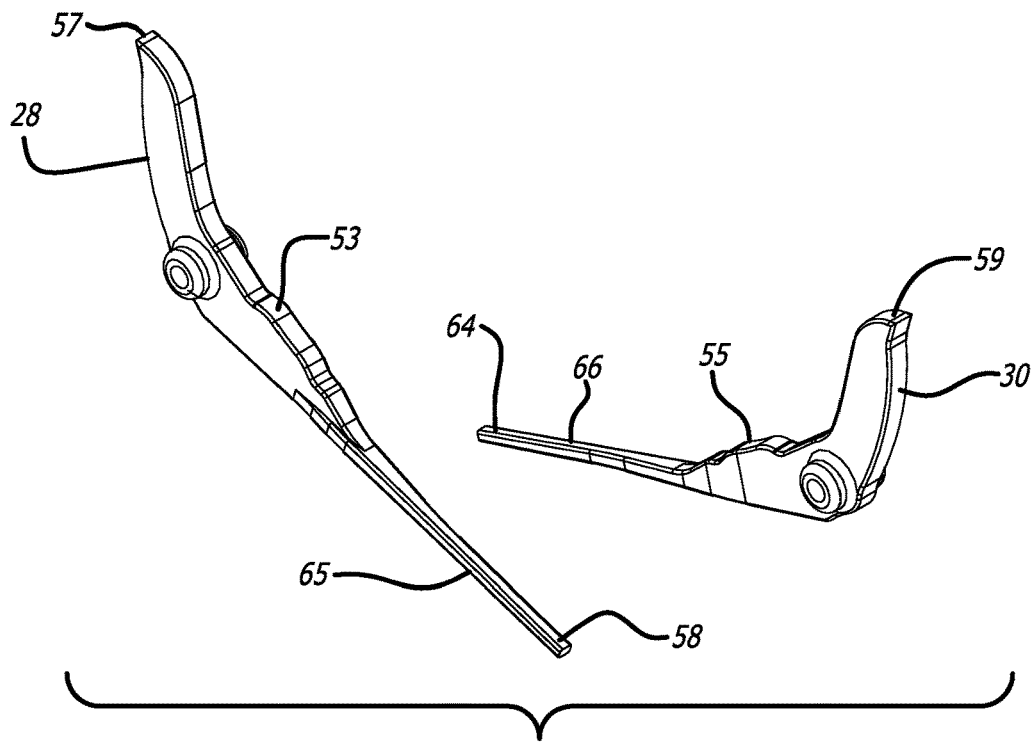
FIGS. 5A and 5B are side perspective views depicting both sides of a first ratchet member and a second ratchet member.
Figure 5B:
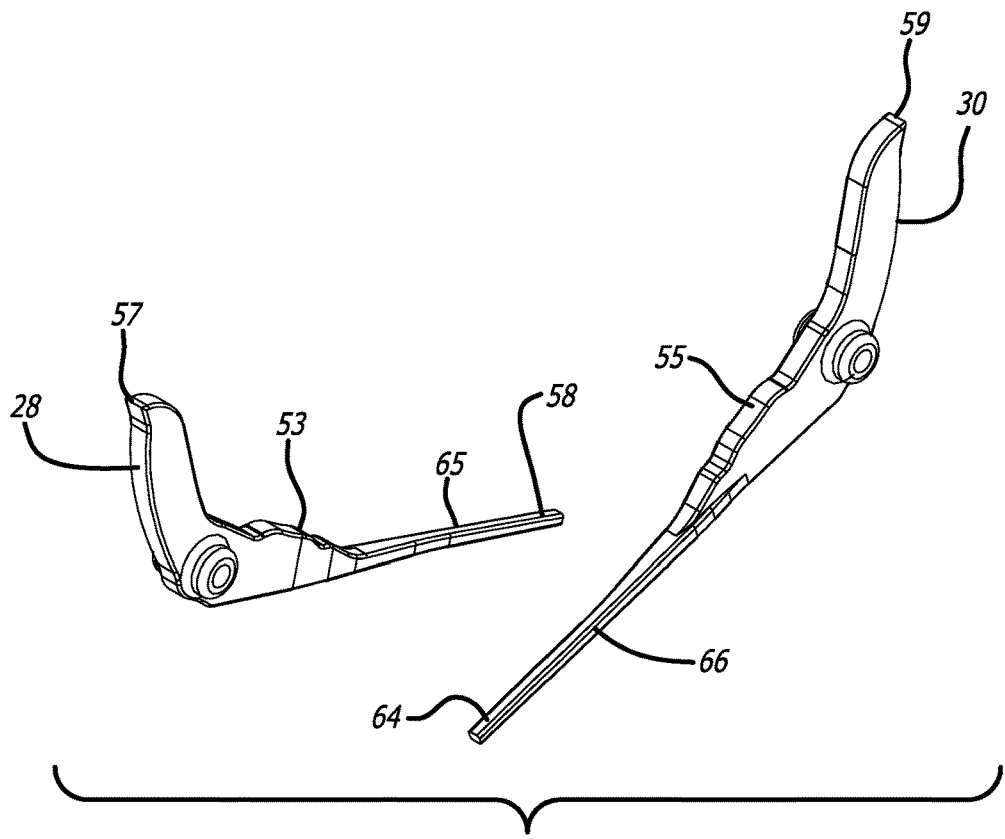
Figure 5C:
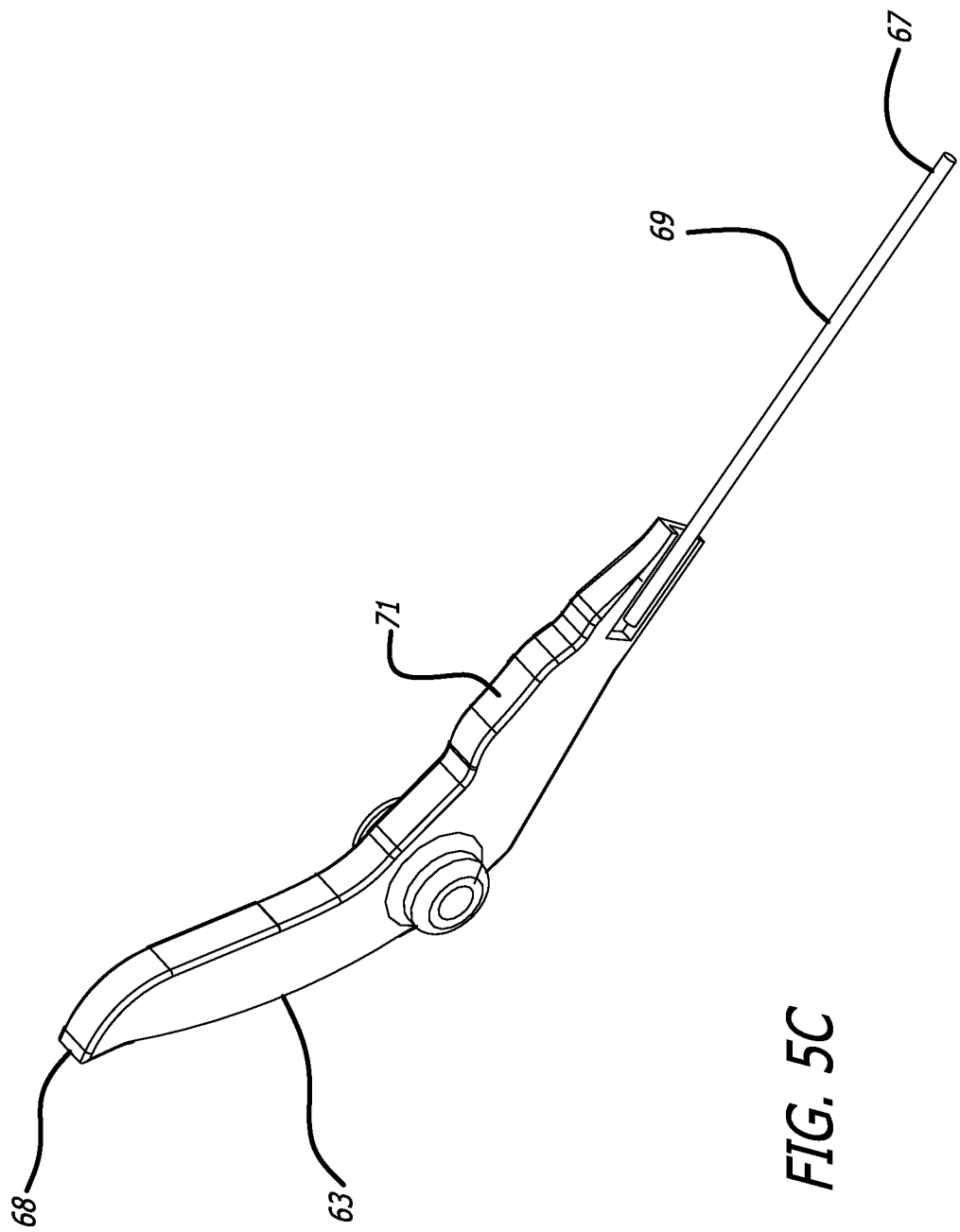
FIG. 5C is a side perspective view depicting an alternative embodiment of a ratchet member.
Figure 6A:
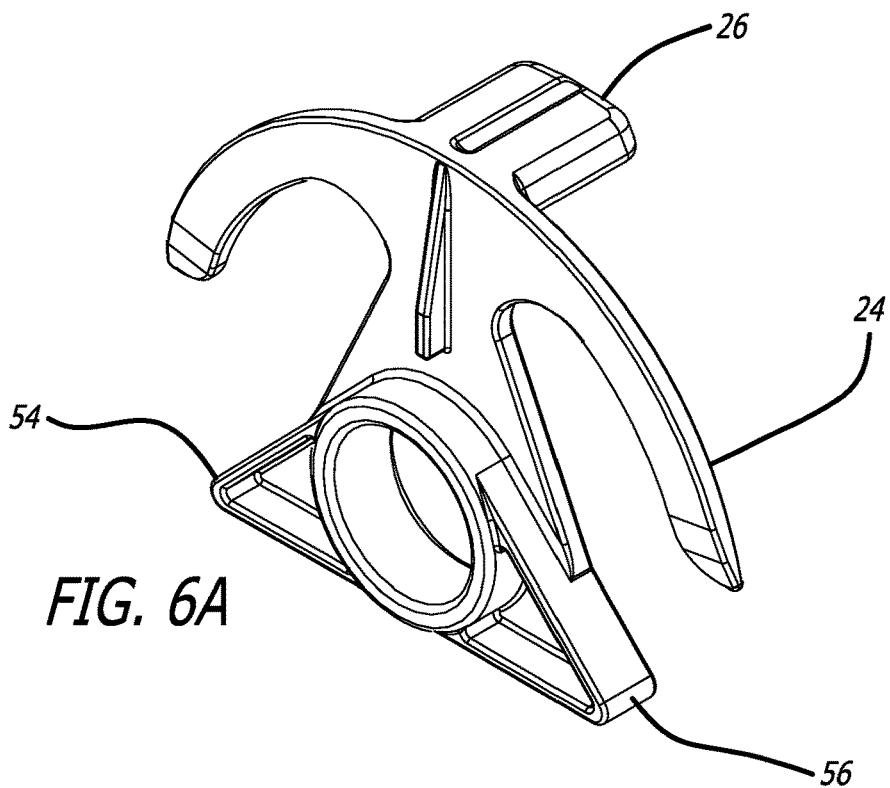
FIGS. 6A and 6B are side perspective views depicting both sides of a selector member.
Figure 6B:
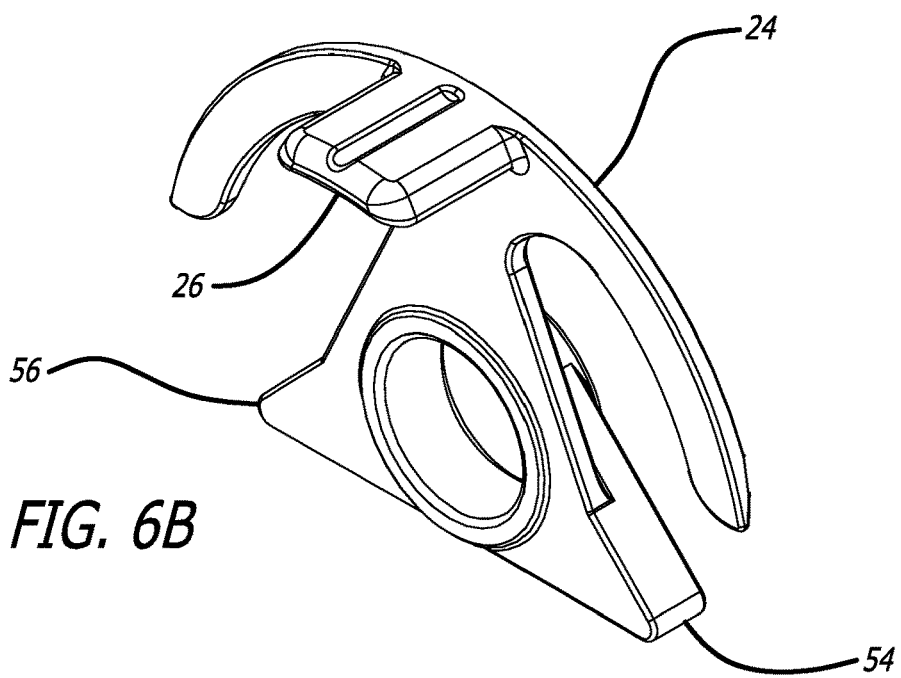
Figure 7A:
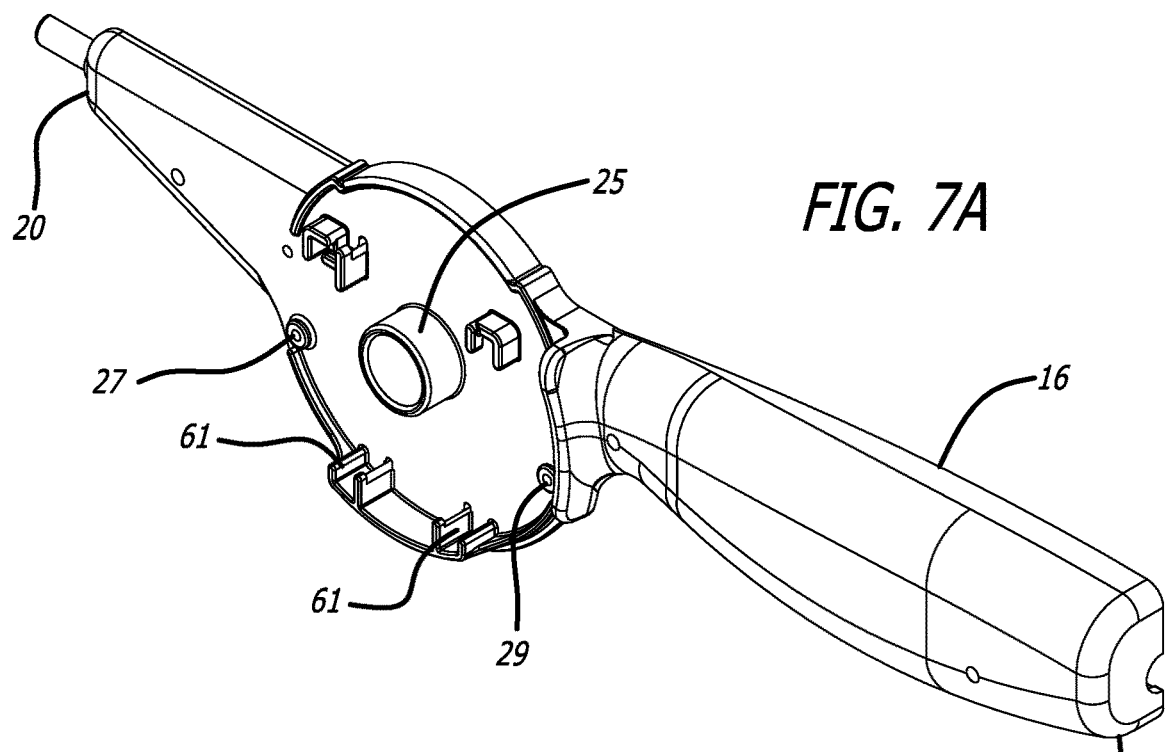
FIGS. 7A and 7B are side perspective views depicting both sides of a handle base.
Figure 7B:
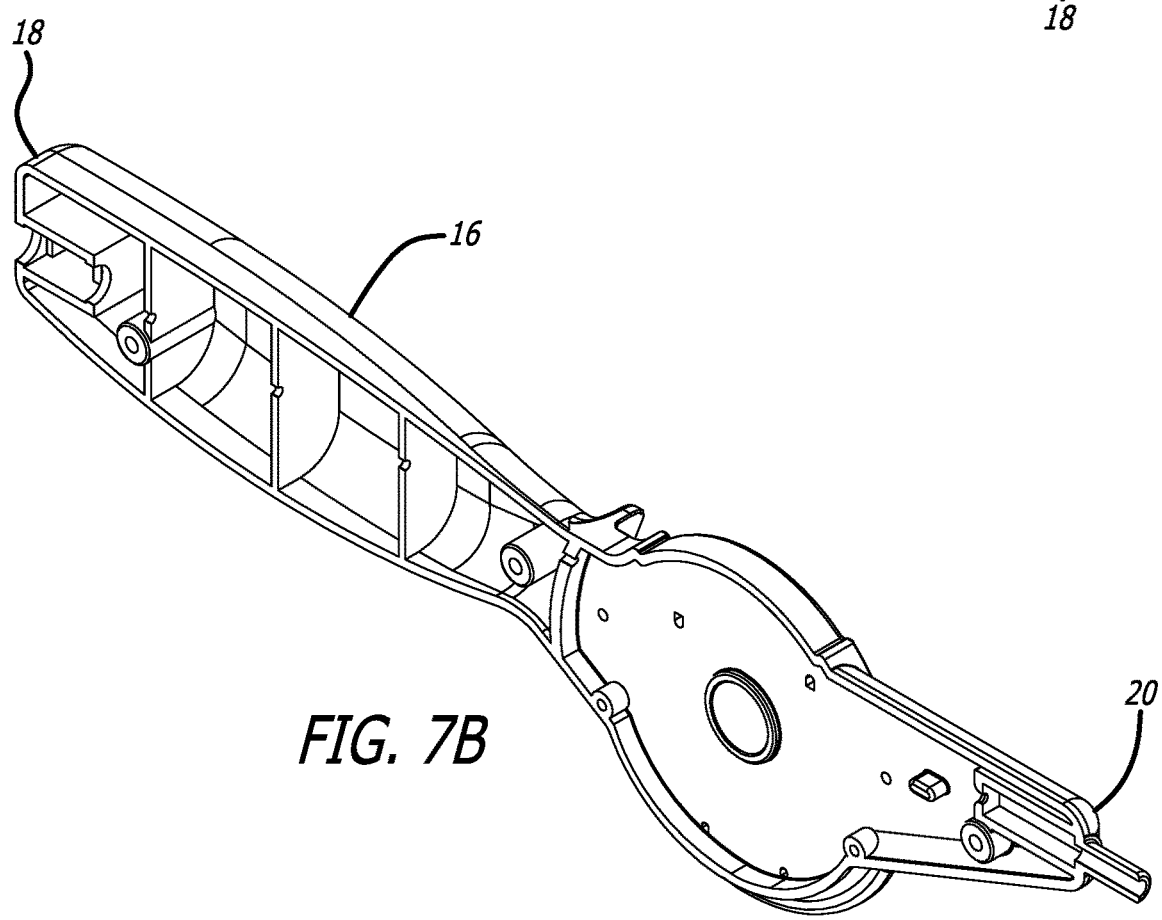
Figure 8A:
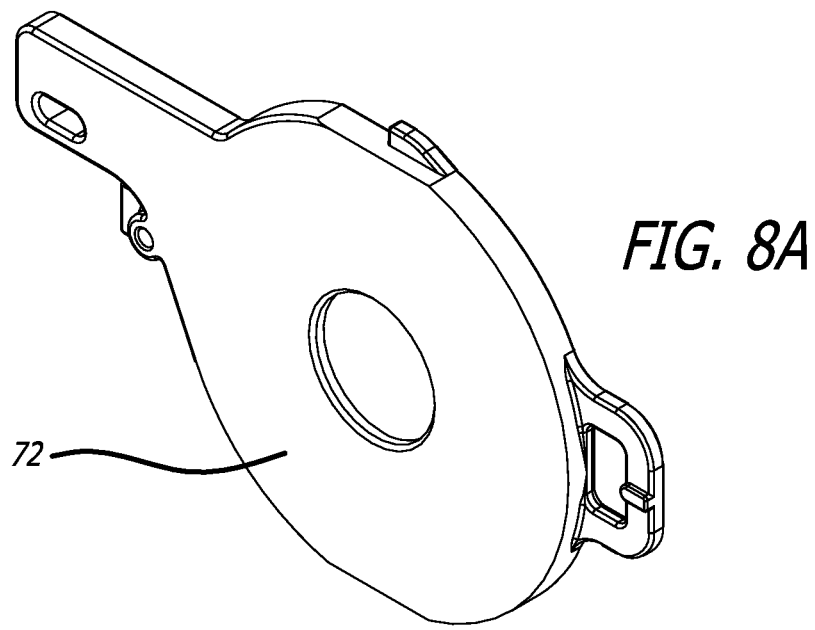
FIGS. 8A and 8B are side perspective views depicting both sides of a pusher containment cup.
Figure 8B:
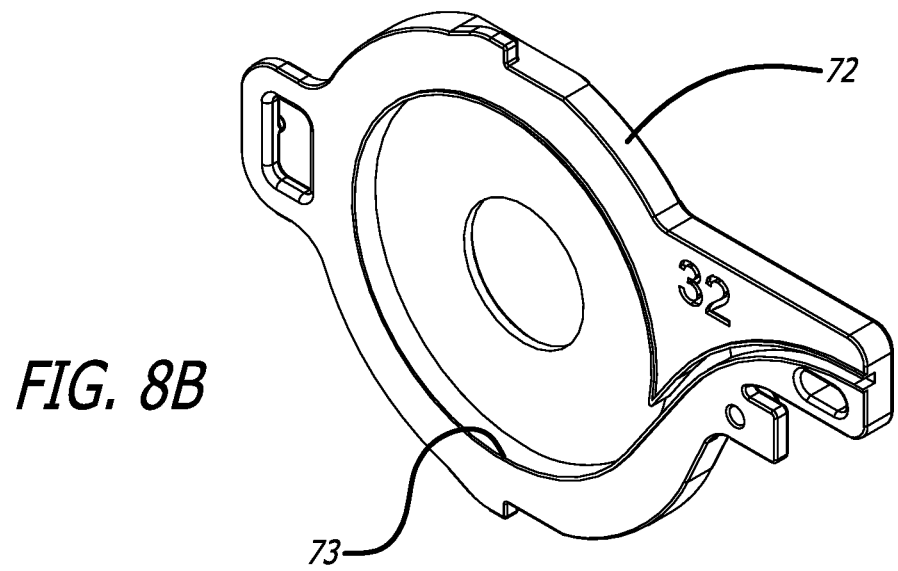
Figure 9A:
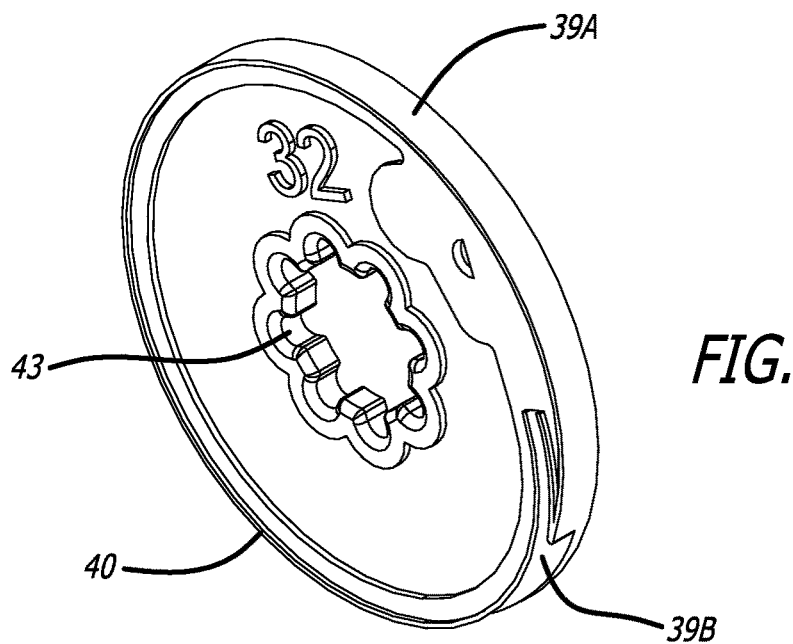
FIGS. 9A and 9B are side perspective views depicting both sides of a pusher spool.
Figure 9B:
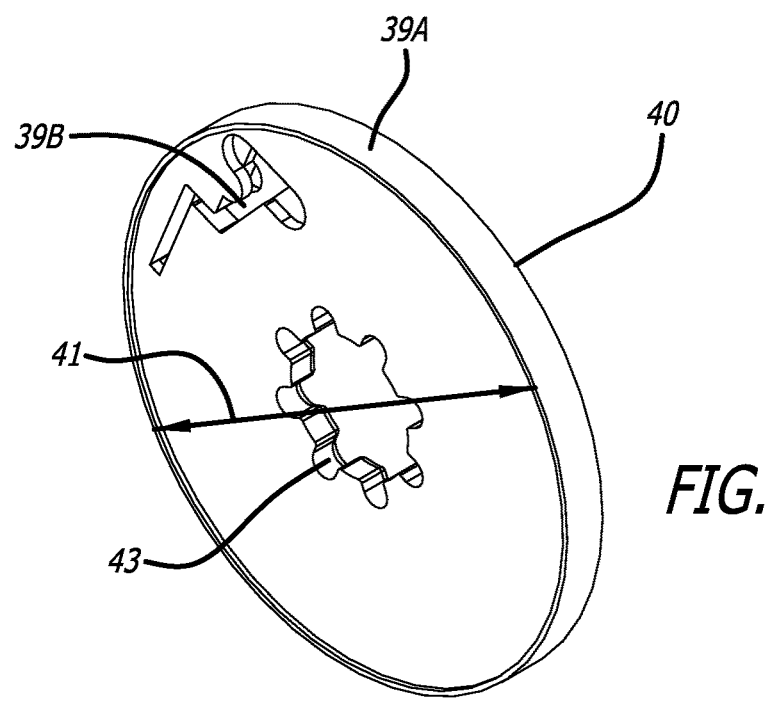
Figure 10A:
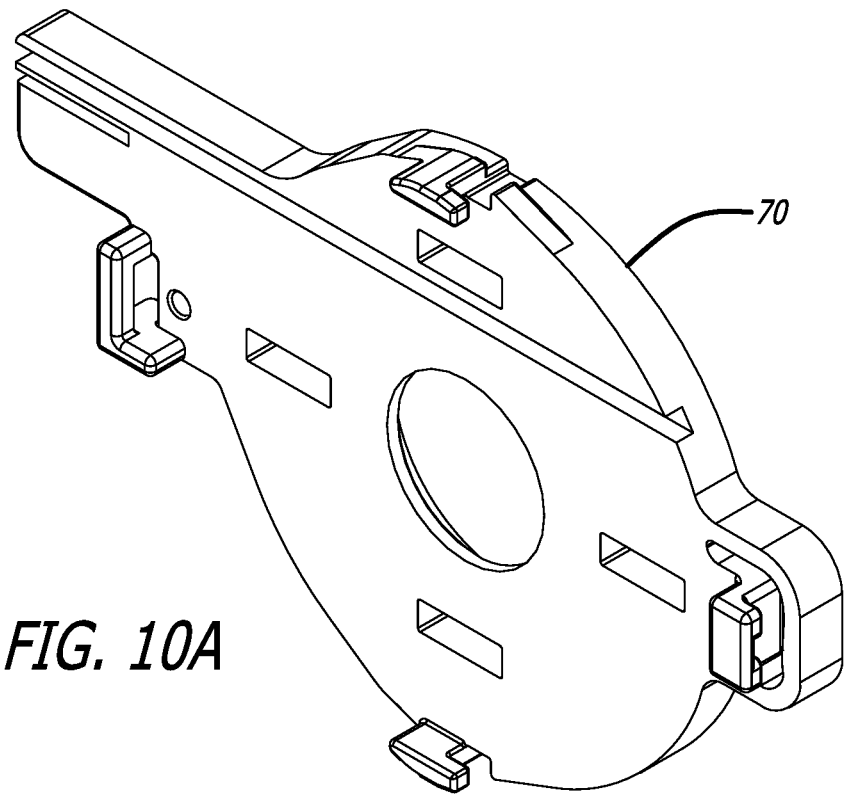
FIGS. 10A and 10B are side perspective views depicting both sides of a sheath containment cup.
Figure 10B:
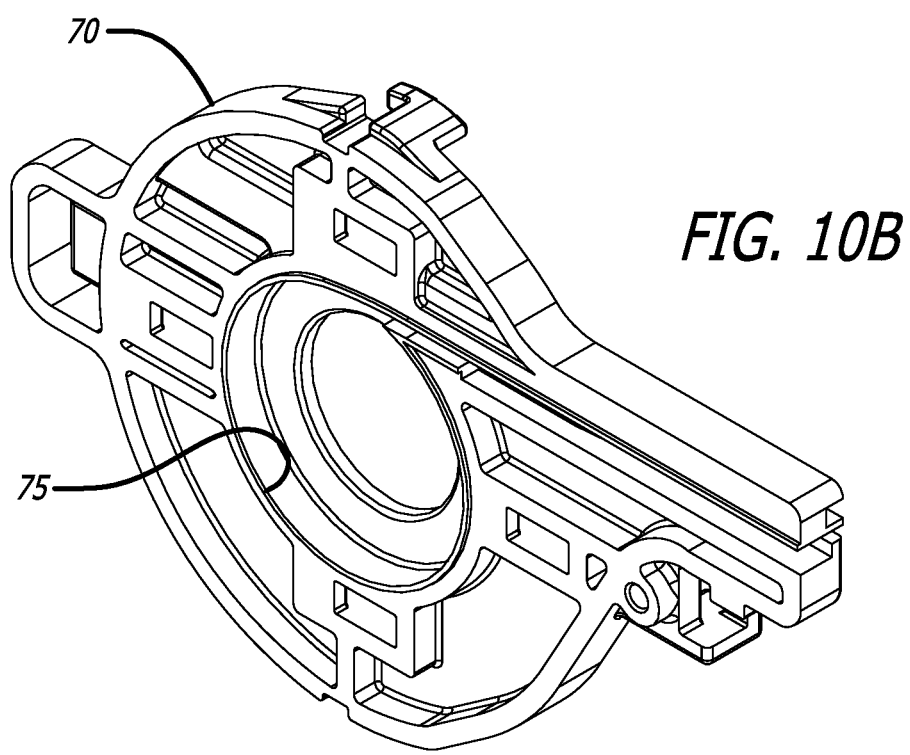
Figure 11A:
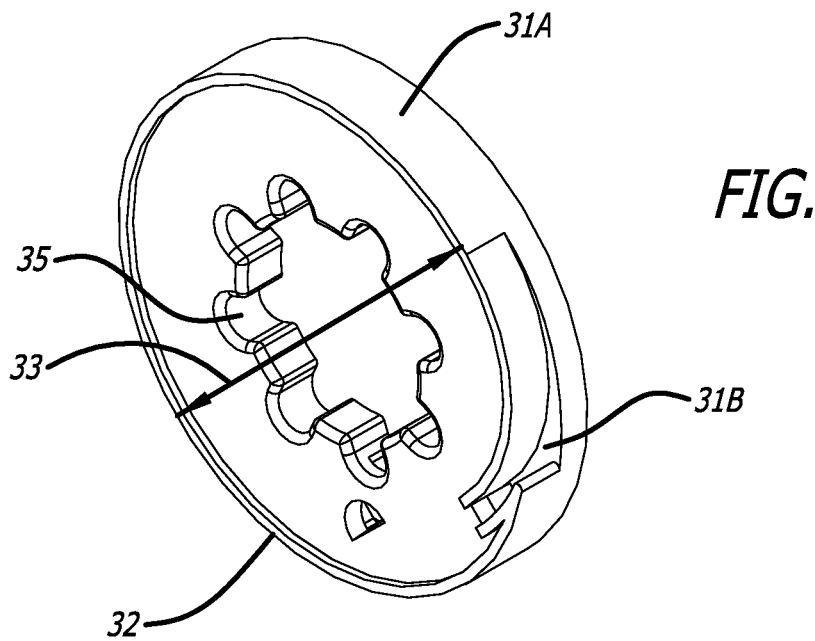
FIGS. 11A and 11B are side perspective views depicting both sides of a sheath spool.
Figure 11B:
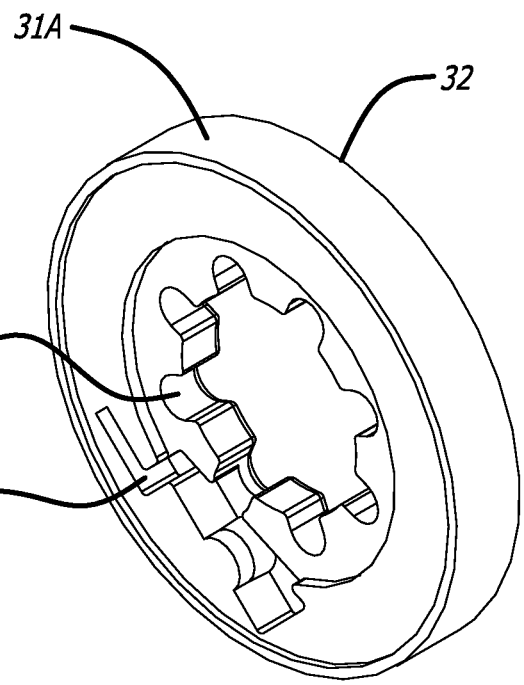
Figure 12A:
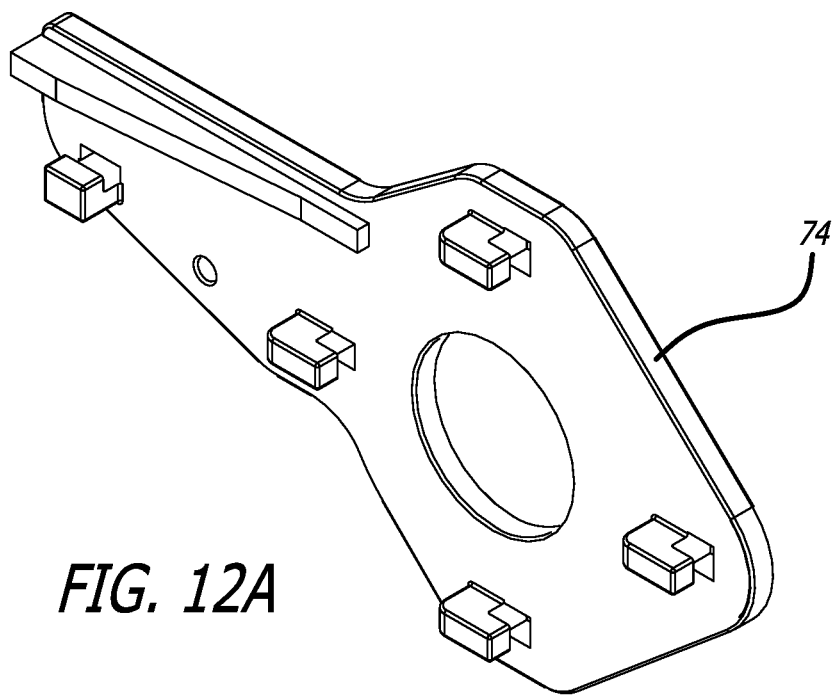
FIGS. 12A and 12B are side perspective views depicting both sides of cover plate.
Figure 12B:
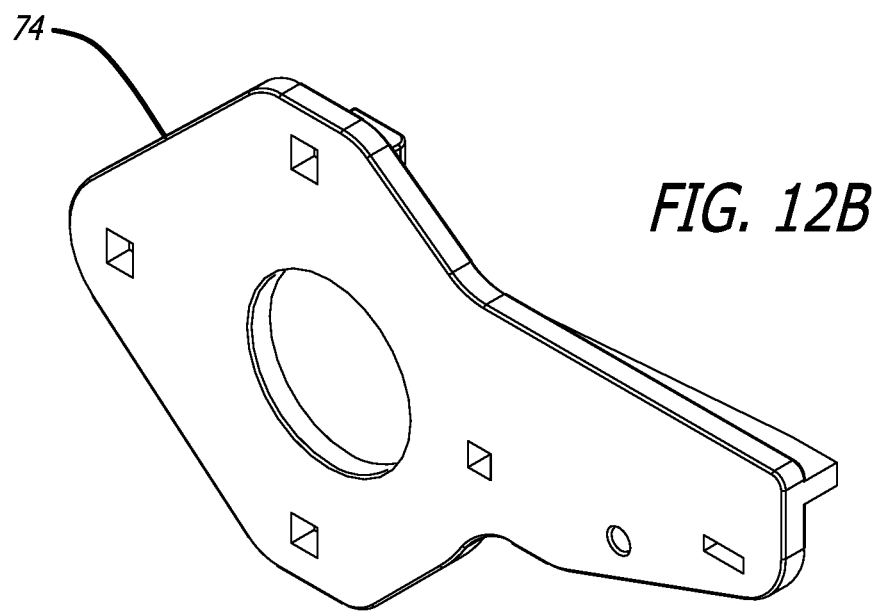
Figure 13A:
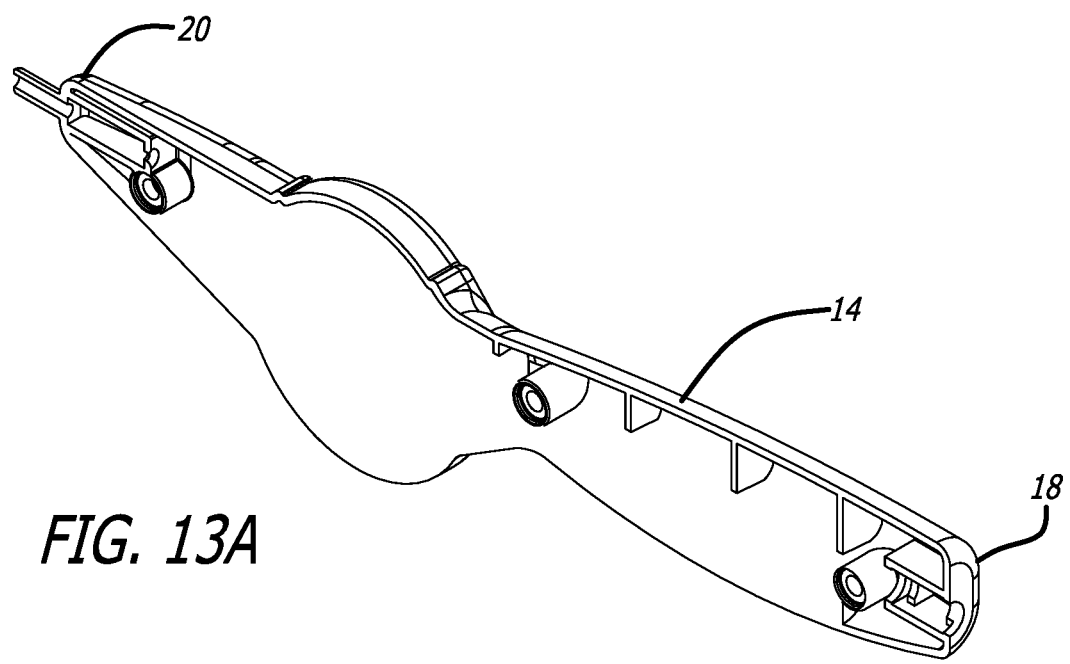
FIGS. 13A and 13B are side perspective views depicting both sides of a handle top.
Figure 13B:
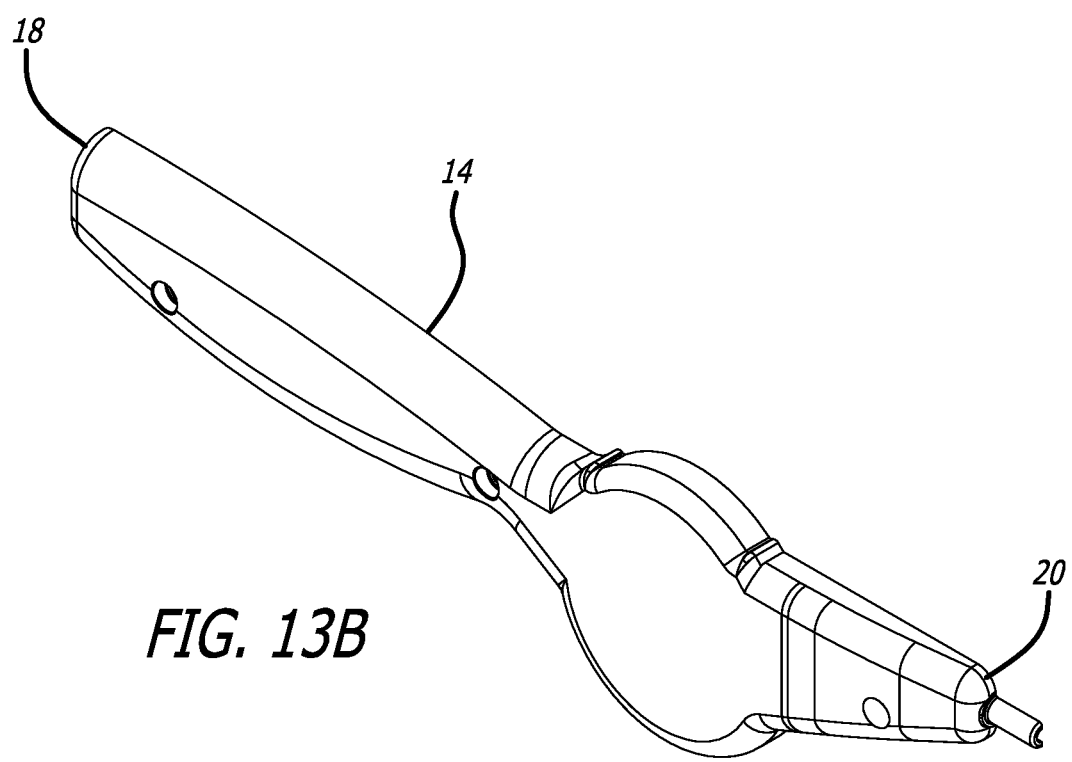
Figure 14:
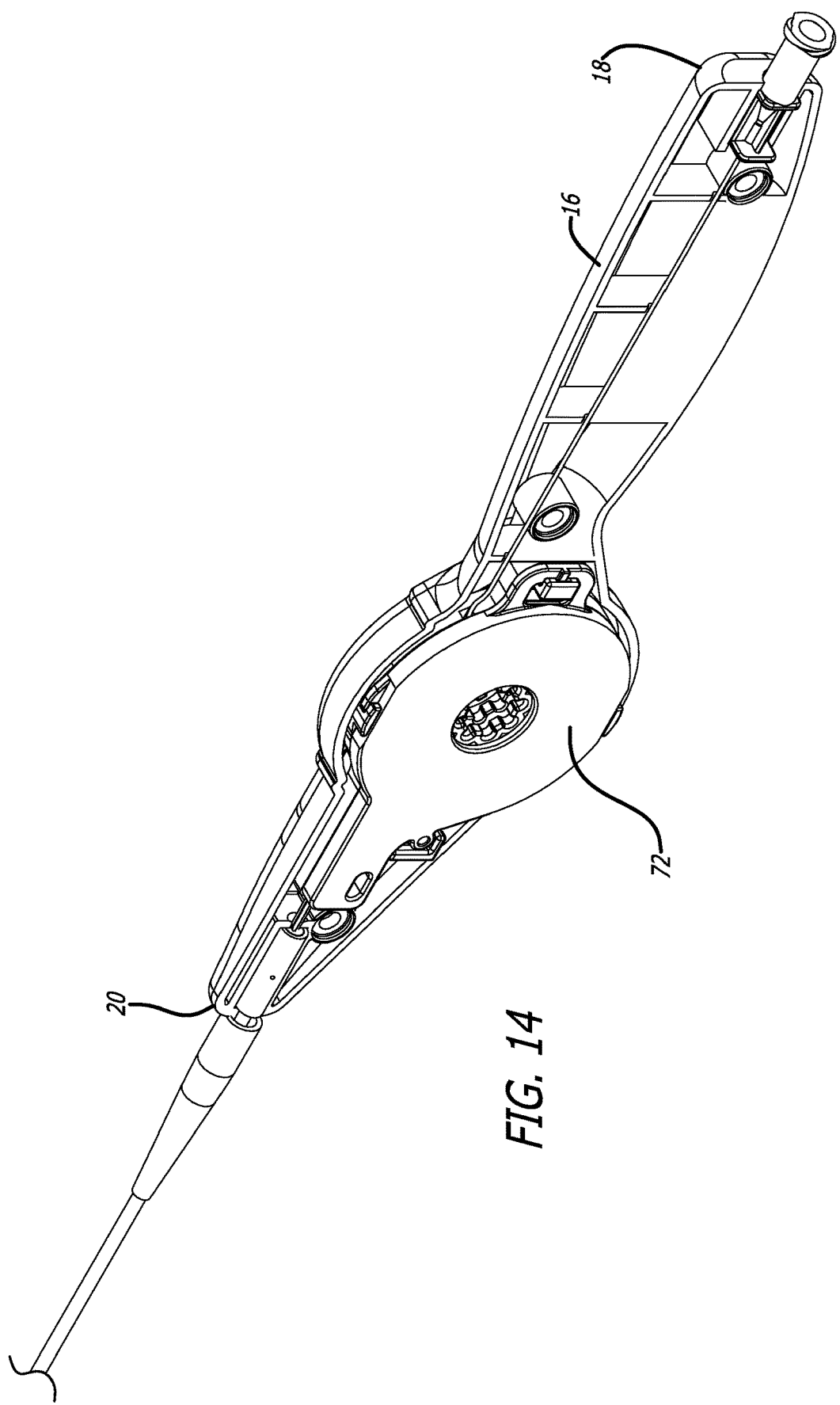
FIG. 14 is a longitudinal cross-sectional view depicting the handle top and pusher containment cup.
Figure 15:
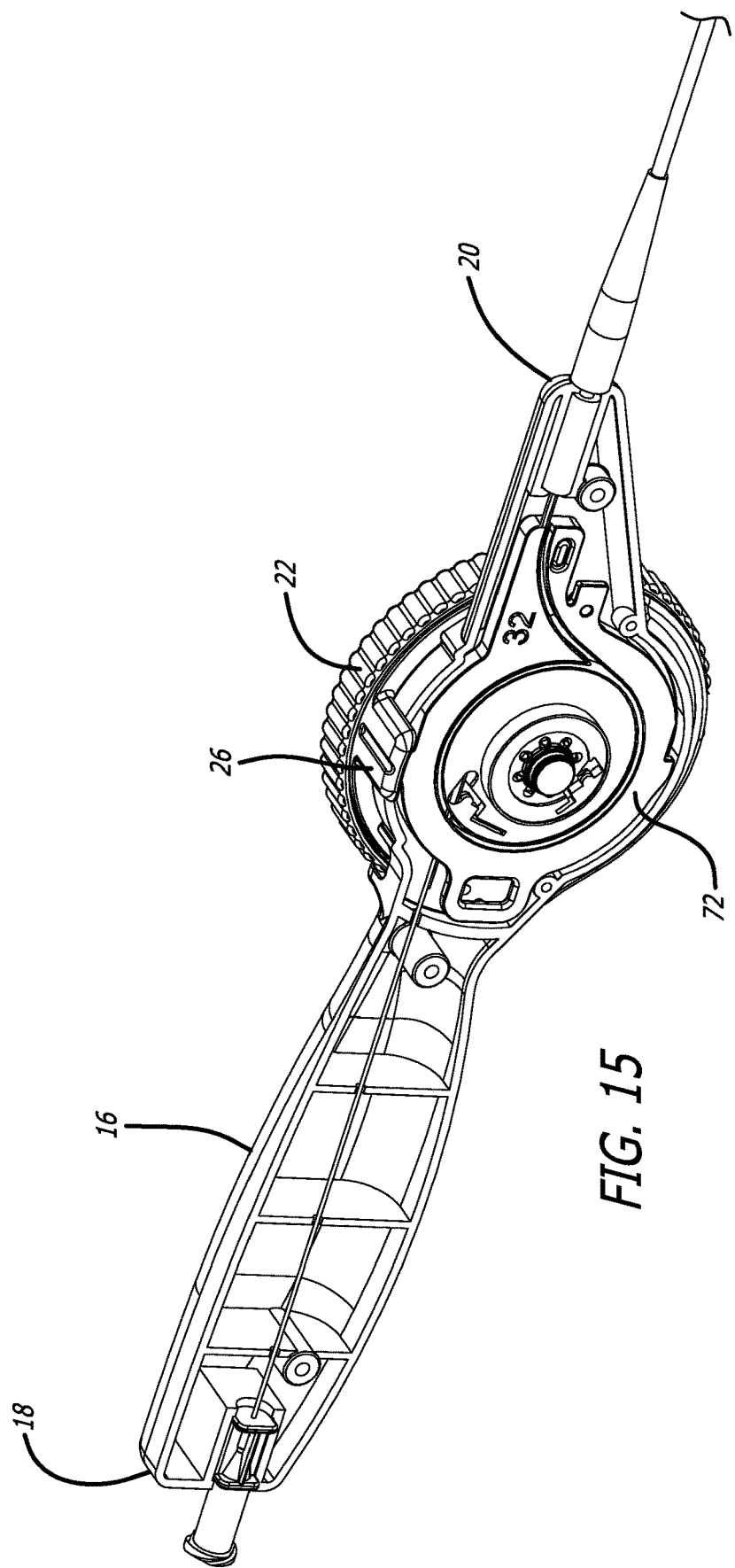
FIG. 15 is a longitudinal cross-sectional view depicting the handle base and pusher spool.
Figure 16:
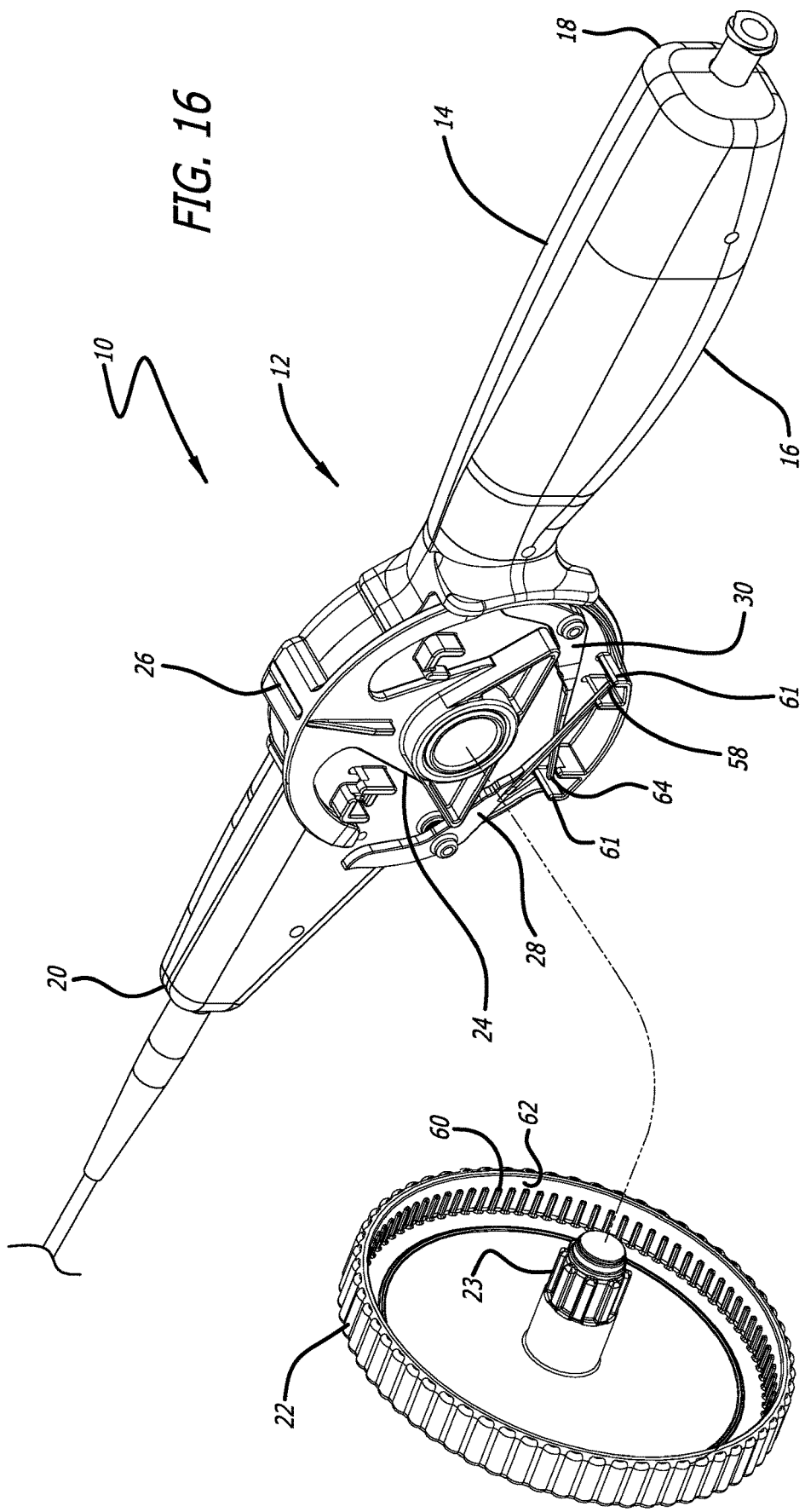
FIG. 16 is a longitudinal cross-sectional view depicting the handle base and the selector member with the thumbwheel in an exploded view for clarity.

In one embodiment, as shown in FIGS. 1-27B, a catheter assembly 10 is used for delivering and implanting a self-expanding stent 11 in a body lumen. A handle assembly 12 has a handle top 14, a handle base 16, a handle proximal end 18, and a handle distal end 20. The handle base 16 and the handle top 14 are connected together and have a number of parts contained therebetween. Attached to the handle base 16 is a thumbwheel 22 and a selector member 24 is pivotally mounted on pivot pin 25 inside of the thumbwheel 22. The thumbwheel has a splined hub 23 that extends through aperture 17 in the handle base 16 so that the thumbwheel 22 can rotate on the splined hub 23. A selector tab 26 is attached to the selector member 24 for use in selecting the direction of rotation of the thumbwheel 22. A first ratchet member 28 and a second ratchet member 30 are pivotally mounted to the handle base on pivot pins 27, 29 respectively, and positioned inside of the thumbwheel 22 so that the selector member 24 can be rotated to engage either or neither of the first ratchet member 28 and the second ratchet member 30. The first ratchet member 28 (FIG. 5A) has a first end 58, a second end 57, a first cam surface 53, and a first spring wire 65. The second ratchet member 30 (FIG. 5B) has a first end 64, a second end 59, a second cam surface 55, and a second spring wire 66. In one embodiment, the first ratchet member 28 and the second ratchet member 30 are formed as a one-piece molded construction of plastic or metal. An alternative ratchet member 63 (FIG. 5C) has a first end 67, a second end 68, a wire rod 69, and a cam surface 71. The wire rod 69 is inserted into and attached to the ratchet member 63 during assembly. The wire rod 69 acts as a spring wire as is further described herein. A sheath spool 32 has a sheath wire 34 wound on a sheath spool outer surface 31A thereon, a distal end 36 of the sheath wire 34 being attached to a sheath 38. A proximal end of the sheath wire 34 is threaded into sheath spool wire channel 31B where it is fixedly attached. The sheath spool 32 has a splined recess 35 that mattingly engages the splined hub 23 when the sheath spool is mounted adjacent the thumbwheel 22. A pusher spool 40 has a pusher wire 42 wound on a pusher spool outer surface 39A thereon, a distal end 44 of the pusher wire 42 is attached to a pusher member 46. A proximal end of the pusher wire 42 is threaded into pusher spool wire channel 39B where it is fixedly attached. The pusher spool 40 has a splined recess 43 that mattingly engages the splined hub 23 when the pusher spool is mounted adjacent the thumbwheel 22.

Figure 17:
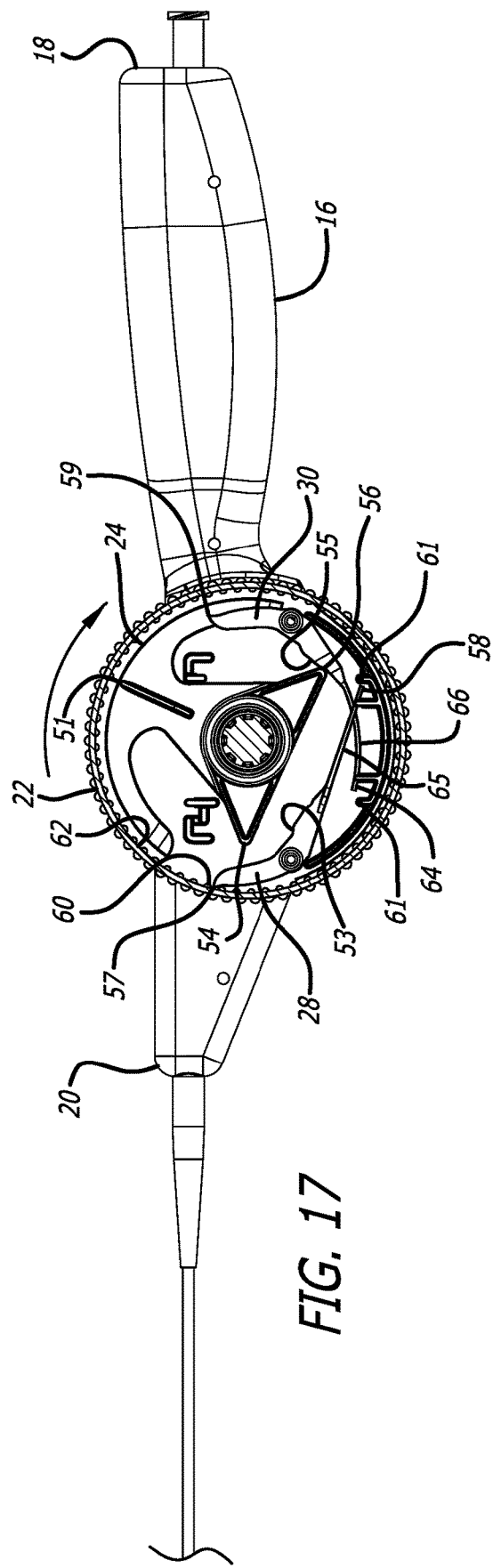
FIG. 17 is a longitudinal cross-sectional view depicting the handle base and selector member set in the forward mode.

As shown most clearly in FIGS. 17-27B, the self-expanding stent 11 is mounted inside a distal portion 48 of the sheath 38 and is positioned distally of the pusher member 46. The self-expanding stent is tightly compressed inside the sheath 38 and minute projections 47 on the distal end of the pusher member 46 extend through the openings of the interwoven wires of the self-expanding stent 11. With the selector tab 26 moved to a forward position 51 on the handle assembly 12 (FIG. 17), the selector member 24 pivots into contact with the second ratchet member 30, which in turn pivots to disengage from the thumbwheel 22 so that the thumbwheel can only rotate in the forward direction, thereby simultaneously withdrawing the sheath 38 proximally and pushing the pusher member 46 distally and thereby pushing the self-expanding stent 11 distally out of the sheath 38 to implant the self-expanding stent 11 in the body lumen. What is meant by the thumbwheel rotating forward is best shown in FIG. 17 where the top of the thumbwheel is pulled and rotated by the physician toward the handle proximal end 18 and in the direction of the arrow. Thus, rotating the thumbwheel 22 in the forward direction will deploy the self-expanding stent 11 in the body lumen. The pusher spool 40 and the sheath spool 32 rotate in the same direction as the thumbwheel. The pusher spool 40 rotates in a forward direction when the thumbwheel 22 is rotating in the forward direction causing the pusher wire to unwind from the pusher spool and advance in a distal direction toward the self-expanding stent. The distal end 44 of the pusher wire 42 is attached to the pusher member 46 so that as the pusher spool 40 rotates in the forward direction, the pusher wire 42 unwinds from the pusher spool 40 and advances distally to advance the pusher member 46 distally and hence push the self-expanding stent 11 distally out of the sheath 38. The sheath spool 32 rotates in a forward direction when the thumbwheel 22 is rotating in the forward direction causing the sheath wire to wind onto the sheath spool 32 and pull the sheath 38 proximally away from the self-expanding stent. A distal end 36 of the sheath wire 34 is attached to a proximal end 49 of the sheath 38 so that as the sheath spool 32 rotates in the forward direction, the sheath wire 34 withdraws proximally to pull the sheath 38 proximally and hence deploy the self-expanding stent 11. As the self-expanding stent 11 exits the sheath 38, the openings in the woven wire strands simply expand away from the minute projections 47 on the pusher member 46 as the stent continues to expand radially outwardly and implant in the body lumen.

Figure 27A:
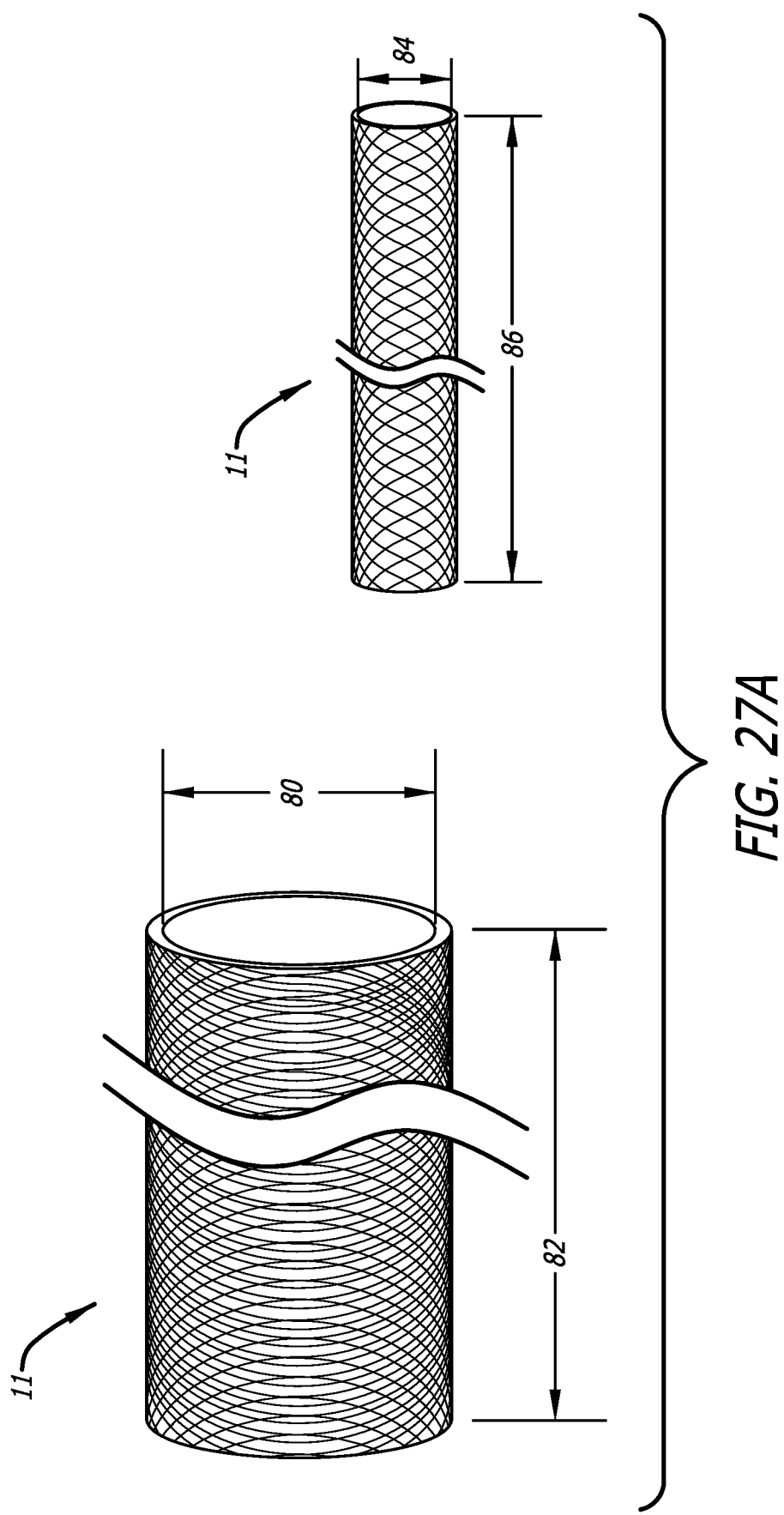
FIG. 27A is an enlarged elevational view of the stent in the expanded and compressed configurations.
Figure 27B:
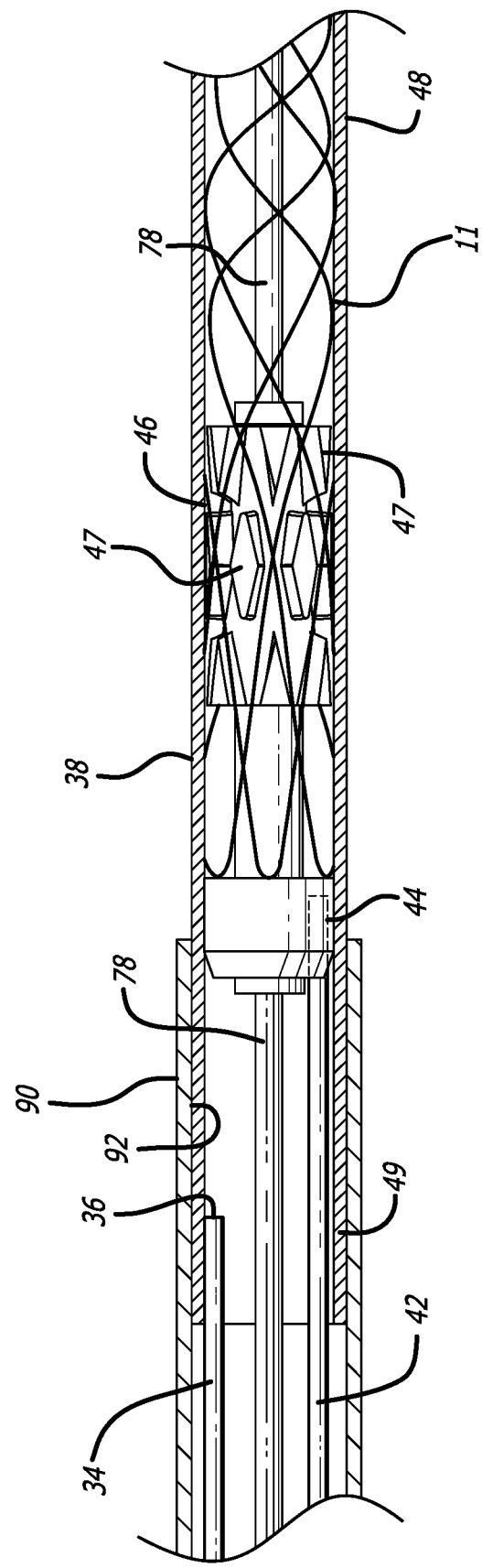
FIG. 27B is an enlarged longitudinal cross-sectional view depicting the stent mounted in the sheath.

In one embodiment shown in FIG. 27B, the pusher member 46 has multiple projections 47 which are configured to engage and retain the self-expanding stent 11. The self-expanding stent 11 has multiple apertures (FIG. 27A) which receive the projections 47 without damaging the self-expanding stent 11. The wires of the self-expanding stent 11 shown in FIG. 27B are not actually stretched out as shown, rather the multiple apertures of the stent fit over the projections 47. Thus, FIG. 27 is just for illustrating the stent wires engaging the projections 47. When the self-expanding stent 11 is completely pushed distally out of sheath 38, the stent self-expands and expands free of the projections 47 and into contact with the body lumen.

With further reference to FIGS. 1-27B, and in particular FIG. 17, the selector member 24 has a first cam 54 and a second cam 56 so that when the selector tab 26 is moved to the forward position 51 (FIG. 17), the selector member 24 pivots so that the second cam 56 engages the second ratchet member 30 to pivot and disengage from the thumbwheel 22. As the selector member 24 pivots, the second cam 56 slides along second cam surface 55, which is curved, causing the second ratchet member 30 to pivot and the second end 59 to disengage from the inner ridges 60 on the thumbwheel 22. As can be seen in FIG. 17, the second cam 56 presses on and slides along second cam surface 55 and causes the second spring wire 66 to bend and thereby impart a spring force in the bent second spring wire 66. When the selector tab is moved to locked position (FIG. 19), the second spring wire 66 will straighten and impart the spring force into the second ratchet member to push the second end 59 into engagement with the inner ridges 60 on the thumbwheel 22 and it will maintain the spring force until the selector tab 26 is again moved to the forward position 51. Still referring to FIG. 17, the first ratchet member 28 remains engaged with the thumbwheel 22 so that as the thumbwheel 22 rotates in the forward direction, the second end 57 of the first ratchet member 28 will engage and ratchet along the inner ridges 60 on the thumbwheel. The first spring wire 65 is straightened out and is imparting a spring force on the first ratchet member 28, forcing the second end 57 into engagement with the inner ridges 60. As the thumbwheel 22 rotates in the forward direction 51 to deploy the stent, the physician has a tactical feedback as the second end 57 of the first ratchet member 28 ratchets and slides over each of the inner ridges 60 on the thumbwheel 22. In an alternative embodiment, the thumbwheel 22 does not have inner ridges 60 along the inner circumferential surface 62. The inner circumferential surface 62 can be smooth (not shown) and self-locking ratchet members (not shown) would engage and disengage with the inner circumferential surface 62 to allow rotation of the thumbwheel 22 in the forward or reverse direction, or lock the thumbwheel 22.

In order to pull the self-expanding stent back into the sheath 38, the selector tab 26 is moved to a reverse position 50 (FIG. 18), whereby the selector member 24 pivots so that the first cam 54 engages the first ratchet member 28 to pivot and disengage from the thumbwheel 22. A second end 57 of the first ratchet member 28 disengages from the inner ridges 60 of the thumbwheel 22 so that the thumbwheel 22 can only rotate in the reverse direction.

When the selector tab 26 is in a locked position 52 (FIG. 19), the first cam 54 and the second cam 56 of the selector member 24 do not engage the first ratchet member 28 and the second ratchet member 30 respectively, so that the second end 57 of the first ratchet member 28 and the second end 59 of the second ratchet member 30 each engage the inner ridges 60 and thereby prevent the thumbwheel 22 from rotating. In the locked position 52, the first spring wire 65 on the first ratchet member 28, and the second spring wire 66 on the second ratchet member 30, each are nearly straightened out imparting a spring force pushing the second end 57 and the second end 59 into engagement with the inner ridges 60 thereby preventing the thumbwheel 22 from rotating.

The sheath spool 32 is mounted in a sheath spool containment cup 70 (FIGS. 10A/10B) in a tight fit in order to maintain the sheath wire 34 on the sheath spool 32. The sheath containment cup 70 has an optional flange 75 that will assist in keeping the sheath wire 34 wound onto the sheath spool outer surface 31A. The pusher spool 40 is mounted in a pusher spool containment cup 72 (FIGS. 8A/8B) in a tight fit in order to maintain the pusher wire 42 on the pusher spool 40. The pusher spool containment cup 72 has an optional flange 73 that will assist in keeping the pusher wire 42 wound onto the pusher spool outer surface 39A. A retainer plate 74 attaches to the sheath containment cup 70 to help retain the sheath spool 32 in the containment cup. Further, the sheath spool 32 and the pusher spool 40 each have optional flanges (not shown) to help keep the respective sheath wire 34 and pusher wire 42 on the spools when winding and unwinding the wires.

Figure 28:
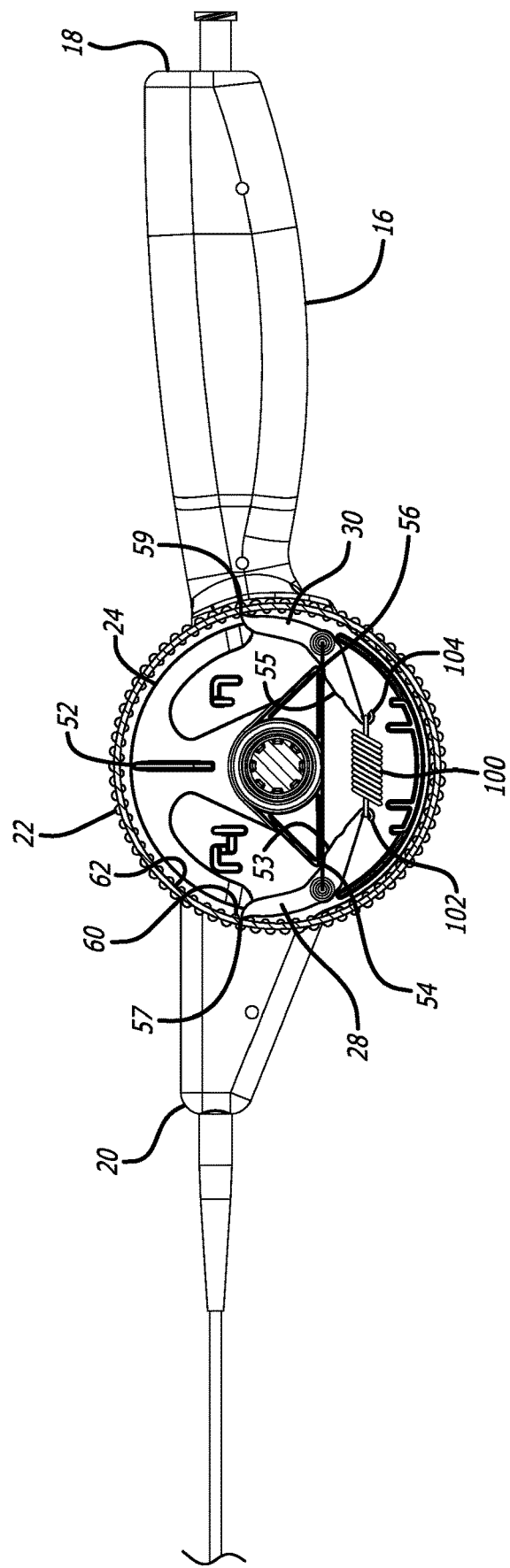
FIG. 28 is a longitudinal cross-sectional view depicting the handle base and selector member set in the locket mode.

In another embodiment, shown in FIG. 28, the selector member 24 is in a locked position 52, the first cam 54 and the second cam 56 of the selector member 24 do not engage the first ratchet member 28 and the second ratchet member 30 respectively, so that the second end 57 of the first ratchet member 28 and the second end 59 of the second ratchet member 30 each engage the inner ridges 60 and thereby prevent the thumbwheel 22 from rotating. In this embodiment, a coil spring 100 is attached to a first hook 102 on the end of the first ratchet member 28 and a second hook 104 on the end of the second ratchet member 30. The coil spring 100 is always in tension, which can vary with the pivoting of the selector member 24. In the locked position 52, the coil spring 100 provides a tension force pulling the first hook 102 and the second hook 104 toward each other, and simultaneously forcing the first end 57 and the second end 59 to both engage the inner ridges 60 on the thumbwheel 22. When the selector tab 26 is moved to the forward position 51 (similar to that shown in FIG. 17), the selector member 24 pivots so that second cam 56 engages second cam surface 55 and thereby pivots the second ratchet member 30 and disengages the second end 59 from the inner ridges 60 of the thumbwheel 22. The thumbwheel 22 is free to rotate in the forward direction and simultaneously withdraw the sheath 38 proximally and push the pusher member 46 distally and thereby push the self-expanding stent 11 distally out of the sheath 38. As the second ratchet member 30 pivots, the coil spring 100 attached to the second hook 104 stretches as the distance between the first hook 102 and the second hook 104 increases. The tension force on coil spring 100 also increases as the coil spring 100 stretches, thereby increasing the contact force applied by the second end 57 as it contacts the inner ridges 60 of the thumbwheel 22. This gives a positive tactile feel as the physician rotates the thumbwheel in the forward direction to deploy the self-expanding stent 11.

Still referring to FIG. 28, when the selector tab 26 is moved to the reverse position 50 (similar to that shown in FIG. 18), the selector member 24 pivots so that first cam 54 engages first cam surface 53 and thereby pivots the first ratchet member 28 and disengages the second end 57 from the inner ridges 60 of the thumbwheel 22. As the thumbwheel 22 is rotated in the reverse direction, the sheath 38 is moved distally and the pusher member 46 is moved proximally to pull the self-expanding stent 11 into the sheath 38.

Again the coil spring 100 stretches which applies increased force on the second end 59 in contact with the inner ridges 60.

In any of the embodiments discloses herein, the sheath spool 32 and the pusher spool 40 can have equal diameters or different diameters. For example, as shown in FIGS. 21-24, the pusher spool 40 has a first pusher spool diameter 41 that is greater than a first sheath spool diameter 33 of the sheath spool 32. In one embodiment, the first sheath spool diameter will stay constant for a family of different sized stents while the first pusher spool diameter 41 will vary with the stent diameter, i.e., the bigger the stent diameter, the bigger the first pusher spool diameter 41. For example, a self-expanding stent 11 having a bigger diameter will coincide with the first pusher spool diameter 41 being bigger so that the pusher spool 40 can provide more displacement of the pusher wire 42 and hence on the pusher member 46 to push the bigger diameter stent distally out of the sheath 38. In one embodiment, the first sheath spool diameter 33 is 0.79 inch (20.0 mm) and the first pusher spool diameter 41 is 1.26 inch (32.0 mm). In another embodiment, the first sheath spool diameter 33 is in the range from 0.39 inch (10.0 mm) to 1.89 inch (48.0 mm) and the first pusher spool diameter 41 is in the range from 0.39 inch (10.0 mm) to 1.89 inch (48.0 mm). These sheath and pusher spool diameters will deliver and implant a wide range of stent lengths and diameters.

In one embodiment, the self-expanding stent 11 has an implanted internal stent diameter 80 in the range from 0.12 inch (3.0 mm) to 0.39 inch (10.0 mm) and an implanted stent length 82 in the range from 1.18 inch (30.0 mm) to 7.87 inch (200.0 mm). These dimensions represent the implanted diameters 80 and stent lengths 82. A self-expanding stent 11 having an implanted length 82 of 3.94 inch (100.00 mm) and an implanted diameter 80 of 0.28 inch (7.0 mm) may have a compressed length 86 from 7.87 inch (200.0 mm) to 11.81 inch (300.0 mm) and a compressed diameter 84 in the range from 0.060 inch (1.5 mm) to 0.24 inch (6.0 mm) when mounted inside sheath 38. As the self-expanding stent 11 expands from the compressed configuration inside the sheath 38, it will shorten in length as disclosed above. Likewise, when the self-expanding stent 11 is pushed out of the sheath 38, it will expand from the compressed configuration to the implanted diameters disclosed above. This will have the effect of deploying a consistent stent length per consistent angular rotation of the thumbwheel 22.

In further keeping with the invention as shown in FIGS. 1-27B, and in particular in FIGS. 27A/27B, the ratio of the self-expanding stent 11 length when in the compressed configuration having a compressed length 86 compared to the expanded, implanted length 82, is in the range of 1.5:1 to 4:1. As an example, a self-expanding stent 11 having a compressed length 86 of 11.81 inch (300 mm) and an implanted length 82 of 3.94 inch (100 mm), would have a ratio of 3:1. In this example, for a 3.94 inch (100 mm) long self-expanding stent 11, the sheath 38 will withdraw proximally 3.94 inch (100 mm) while the pusher member 46 simultaneously advances distally 7.87 inch (200 mm) to push the self-expanding stent 11 distally out of the proximally moving sheath 38. Thus, the 3.94 inch (100 mm) movement of the sheath 38 proximally plus the 7.87 inch (200 mm) movement of the pusher member 46 distally results in an overall stent movement of 11.81 inch (300 mm), compared to the 3.94 inch (100 mm) of the implanted length 32, providing the ratio of 3:1. It is critically important to simultaneously move the pusher member 46 distally and push the self-expanding stent 11 out of sheath 38 and move the sheath 38 proximally, because as the self-expanding stent 11 exits the sheath 38 it immediately self-expands into contact with the vessel wall. This procedure ensures that the self-expanding stent 11 will be implanted in the exact part of the vessel selected by the physician.

In one embodiment, as shown in FIGS. 24-27B, a stabilizer 90 has a stabilizer lumen 92 for slidably receiving the sheath 38. The stabilizer 90 is fixedly attached to the handle distal end 20. The stabilizer lumen 92 is sized to slidably receive the sheath 38 so that the sheath 38 can easily slide therein without kinking, yet be supported as the sheath 38 moves as much as 3.94 inch (100 mm), more or less. The stabilizer 90 provides support for the sheath 38 and the stabilizer lumen 92 provides a tunnel or lumen for a guidewire lumen 78, the sheath wire 34, and the pusher wire 42 so that the wires are not exposed to the body lumen or to a guide catheter (not shown) or introducer (not shown). Depending upon the length of the self-expanding stent 11 to be implanted, the stabilizer can be the same length as the sheath 38, or it can be significantly longer, up to 130 cm. If, for example, the sheath 38 has a 3.94 inch (100 mm) long self-expanding stent 11 mounted therein, then the sheath 38 must be at least 3.94 inch (100 mm) long, and the stabilizer 90 can be at least this long, up to 130 cm.

Method of Use

The method of use includes a system for delivering a self-expanding stent to a body lumen such as a peripheral artery, and implanting the self-expanding stent in the artery. The catheter assembly operates in three different modes, namely, the forward position 51 (FIG. 17) to deploy the stent, the reverse position 50 (FIG. 18) to retrieve the stent, and the locked position 52 (FIG. 19) in which the thumbwheel 22 cannot rotate.

In one embodiment, as shown in FIGS. 1-27B, and in particular FIG. 17, a catheter assembly 10 is used for delivering and implanting a self-expanding stent 11 in a body lumen. With the selector tab 26 moved to a forward position 51 on the handle assembly 12, the selector member 24 pivots into contact with the second ratchet member 30, which in turn pivots and disengages from the thumbwheel 22 so that the thumbwheel can only rotate forward, thereby simultaneously withdrawing the sheath 38 proximally and pushing the pusher member 46 proximally and thereby pushing the self-expanding stent 11 distally out of the sheath 38 to implant the self-expanding stent 11 in the body lumen. Thus, as the physician rotates the thumbwheel 22 in the forward direction (the top of the thumbwheel rotating from the handle distal end toward the handle proximal end) using his/her thumb, the pusher spool 40 rotates in the forward direction and pushes the pusher wire 42 distally to push the stent 11 distally out of the sheath 38. Simultaneously, the sheath spool 32 rotates in the forward direction and the sheath wire 39 pulls the sheath 38 proximally. The pusher spool 40 rotates in a forward direction when the thumbwheel 22 is rotating in the forward direction so that the pusher wire 42 will unwind from the pusher spool 40 and advance in a distal direction toward the self-expanding stent. The distal end 44 of the pusher wire 42 is attached to the pusher member 46 so that as the pusher spool 40 rotates in the forward direction, the pusher wire 42 advances distally to advance the pusher member 46 distally and hence push the self-expanding stent 11 distally out of the sheath 38. The sheath spool 32 rotates in a forward direction when the thumbwheel 22 is rotating in the forward direction and the sheath wire will wind onto the sheath spool 32 and pull the sheath 38 proximally away from the self-expanding stent. A distal end 36 of the sheath wire 34 is attached to a proximal end 49 of the sheath 38 so that as the sheath spool 32 rotates in the forward direction, the sheath wire 34 withdraws proximally to pull the sheath 38 proximally and hence deploy the self-expanding stent 11. As the self-expanding stent 11 exits the sheath 38, the openings in the woven wire strands simply expand away from the minute projections 47 on the pusher member 46 as the stent continues to expand radially outwardly and implant in the body lumen.

With further reference to the method of use as shown in FIGS. 1-27B and FIG. 17, the selector member 24 is used to determine if the thumbwheel rotates forward to deploy the stent, in reverse to pull the stent back into the sheath, or to lock the thumbwheel from any rotation. The selector member 24 has a first cam 54 and a second cam 56 so that when the selector tab 26 is moved to the forward position 51 (FIG. 17), the selector member 24 pivots so that the second cam 56 contacts the second ratchet member 30 to pivot and disengage from the thumbwheel 22. A second end 59 of the second ratchet member 30 disengages from inner ridges 60 spaced along an inner circumferential surface 62 of the thumbwheel 22. The second end 57 of the first ratchet member 28 engages the inner ridges 60 of the thumbwheel 22 so that the thumbwheel can only rotate in the forward direction.

As the selector member 24 pivots, the second cam 56 slides along second cam surface 55, which is curved, causing the second ratchet member 30 to pivot and the second end 59 to disengage from the inner ridges 60 on the thumbwheel 22. As can be seen in FIG. 17, the second cam 56 presses on and slides along second cam surface 55 and causes the second spring wire 66 to bend and thereby impart a spring force in the bent second spring wire 66. When the selector tab is moved to locked position (FIG. 19), the second spring wire 66 will mostly straighten and impart the spring force into the second ratchet member to push the second end into engagement with the inner ridges 60 on the thumbwheel 22 and it will maintain the spring force until the selector tab 26 is again moved to the forward position 51. Still referring to FIG. 17, the first ratchet member 28 remains engaged with the thumbwheel 22 so that as the thumbwheel 22 rotates in the forward direction the second end 57 of the first ratchet member 28 will engage and ratchet along the inner ridges 60 on the thumbwheel. The first spring wire 65 is nearly straightened out and is imparting a spring force on the first ratchet member 28 forcing the second end 57 into engagement with the inner ridges 60. As the thumbwheel 22 rotates in the forward direction 51 to deploy the stent, the physician has a tactical feedback as the second end 57 of the first ratchet member 28 ratchets and slides over each of the inner ridges 60 on the thumbwheel 22.

Figure 18:
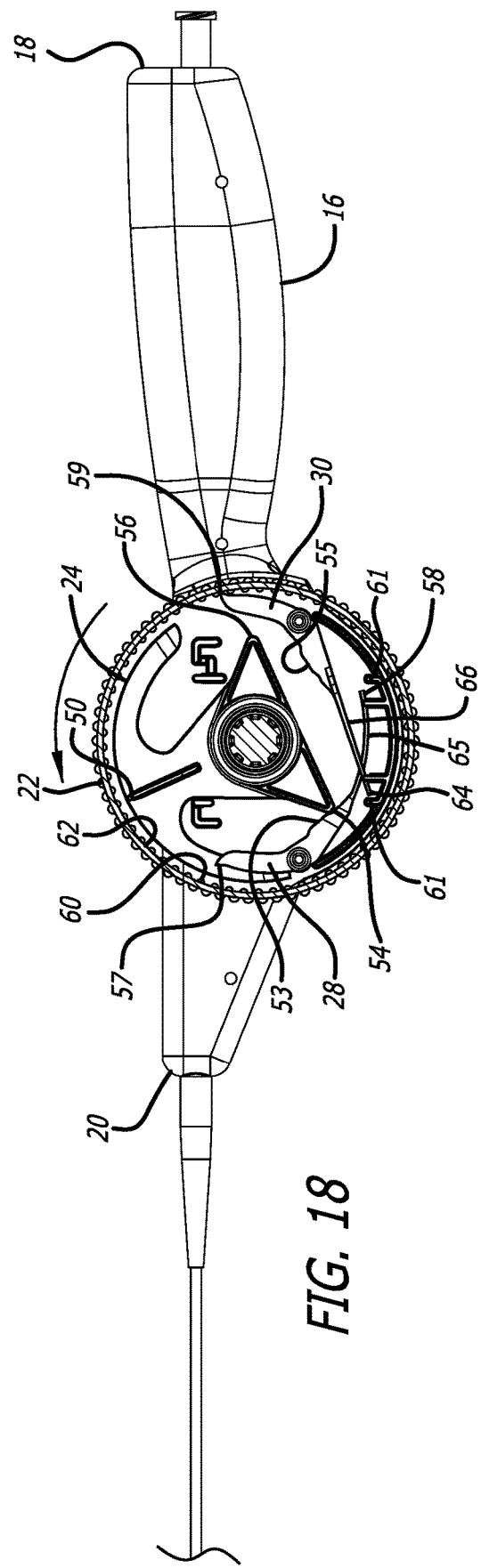
FIG. 18 is a longitudinal cross-sectional view depicting the handle base and selector member set in the reverse mode.

In order to pull the self-expanding stent 11 back into the sheath 38, the selector tab 26 is moved to a reverse position 50 (FIG. 18), and the selector member 24 pivots so that the first cam 54 contacts the first ratchet member 28 to pivot and disengage from the thumbwheel 22. A second end 57 of the first ratchet member 28 disengages from the inner ridges 60 of the thumbwheel 22. The second end 59 of the second ratchet member 30 engages the inner ridges 60 of the thumbwheel 22 so that the thumbwheel can only rotate in the reverse direction. As shown in FIG. 18, as the thumbwheel 22 rotates in the reverse direction (direction of the arrow), the sheath spool 32 and the pusher spool 40 also rotate in the reverse direction. The first cam 54 on the selector member 24 presses on and slides along first cam surface 53 on the first ratchet member 28 causing it to pivot and the second end 57 to disengage from the inner ridges 60. Simultaneously, as the first cam 54 presses and slides along first cam surface 53, the first spring wire 65 bends and forms a spring force in the first spring wire 65. The second end 59 of the second ratchet member 30 remains engaged with the inner ridges 60 and the nearly straightened second spring wire 66 uses its remaining spring force to provide a continuous force on second end 59. As the physician rotates the thumbwheel 22 in the reverse direction, the sheath spool 32 rotates in the reverse direction and unwinds the sheath wire 34 off of the sheath spool 32 thereby advancing the sheath wire 34 distally and pushing the sheath 38 distally to recover the self-expanding stent. The pusher spool 40 also rotates in the reverse direction and winds the pusher wire 42 onto the pusher spool 40 thereby withdrawing the pusher wire 42 proximally and pulling the pusher member 46 proximally. The self-expanding stent is removably attached to the pusher member 46 so the self-expanding stent is pulled proximally back into the sheath 38. Recovering the self-expanding stent 11 can occur until the stent starts to come off of the projections 47 on the pusher member 46, which can be up to 90% of the deployment length. In other words, the self-expanding stent 11 has to still be engaged with the projections 47 in order to pull the stent back into the sheath.

Figure 19:
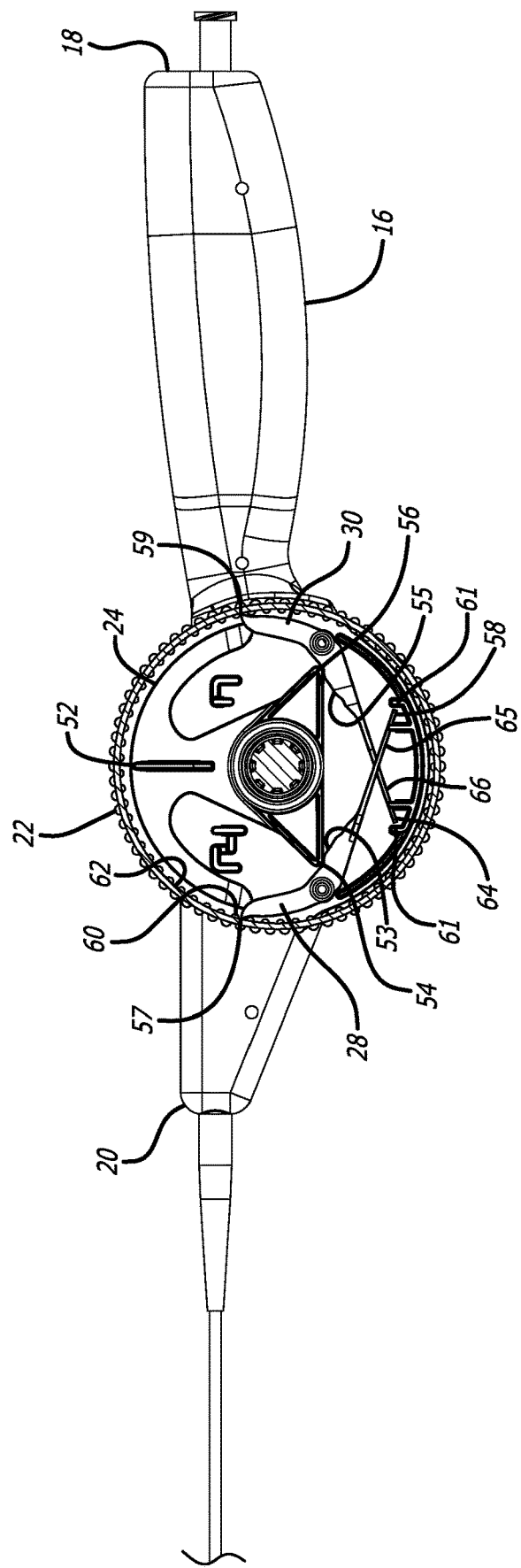
FIG. 19 is a longitudinal cross-sectional view depicting the handle base and selector member set in the locked mode.
Figure 20:
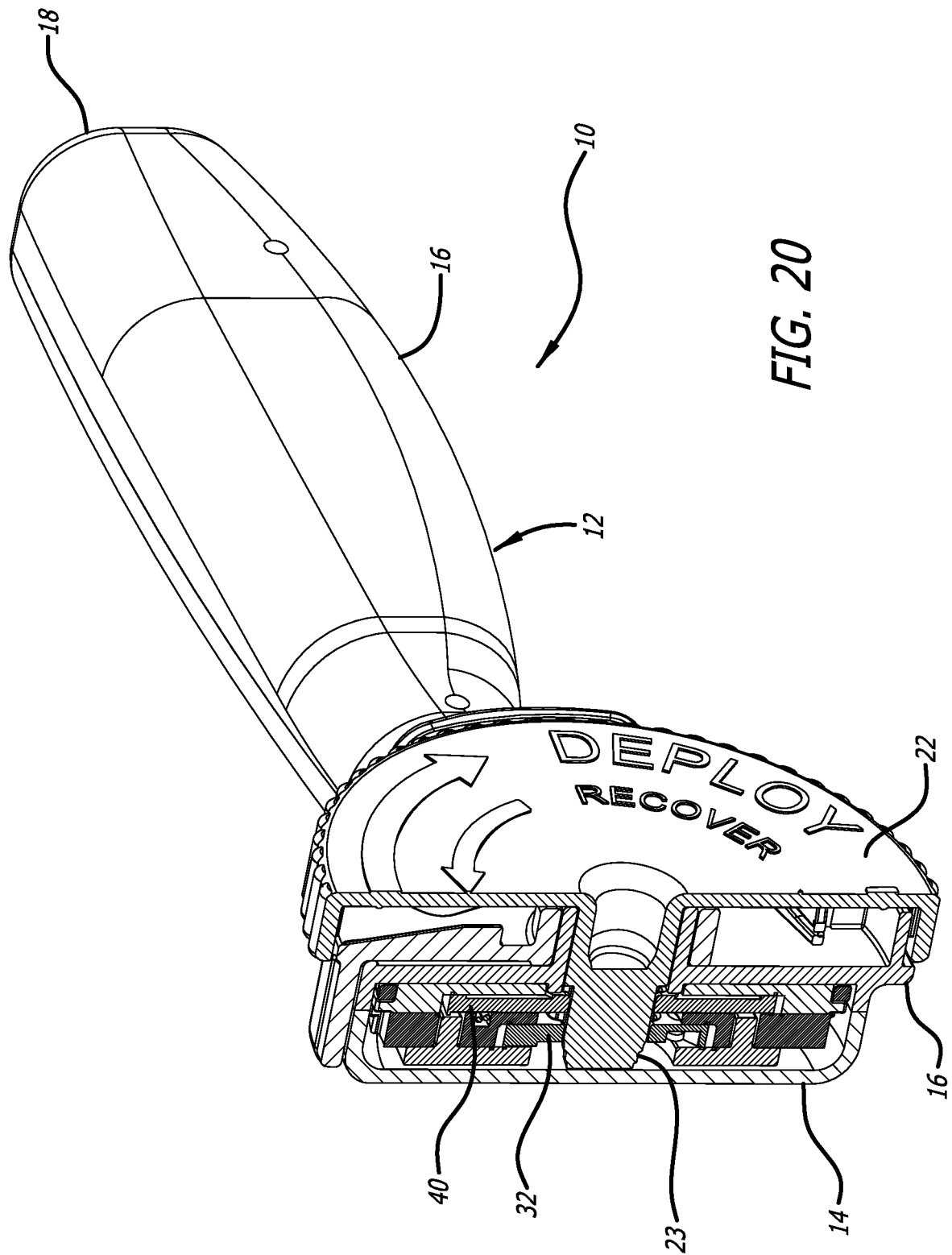
FIG. 20 is a transverse cross-sectional view taken through a centerline of the thumbwheel and depicting the pusher spool and sheath spool.
Figure 21:
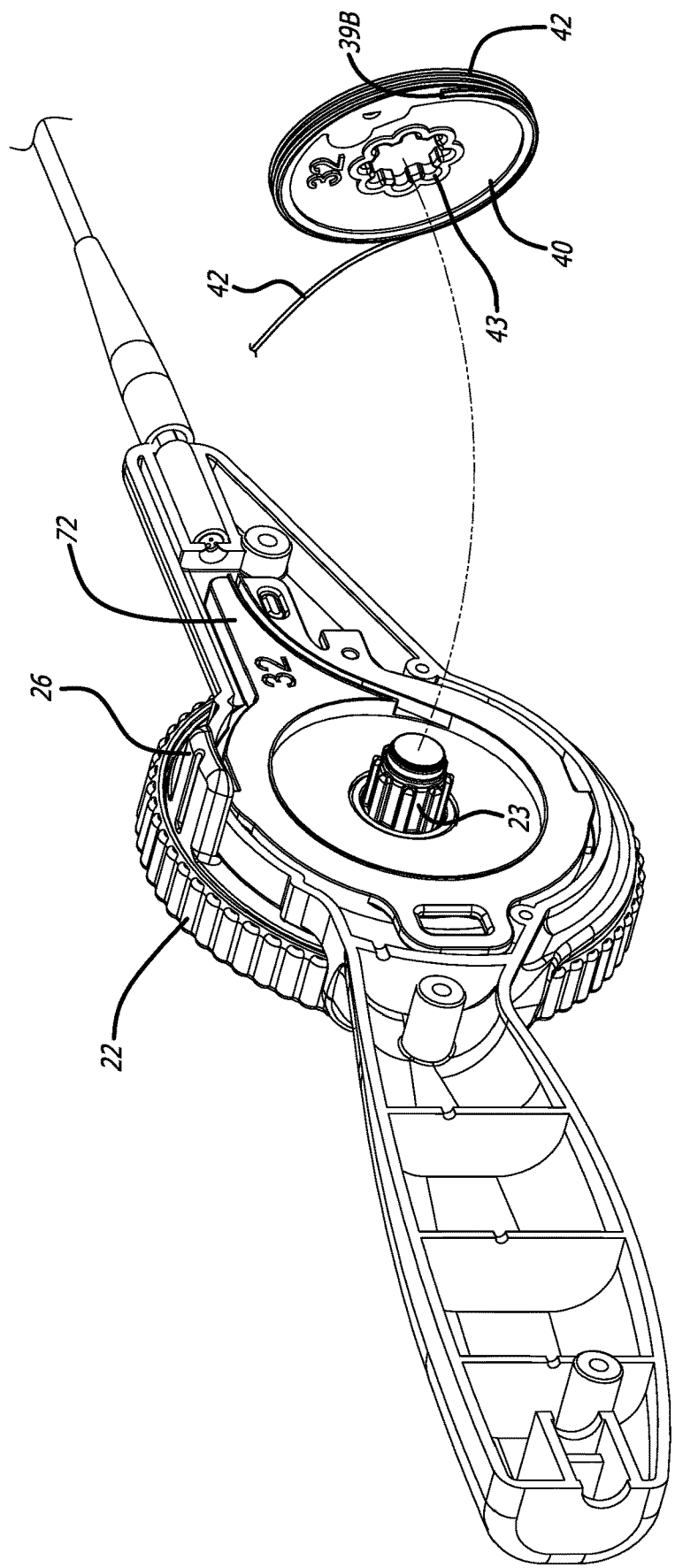
FIG. 21 is a side perspective view depicting the pusher spool of FIGS. 9A and 9B and the guide path for the pusher wire.
Figure 22:
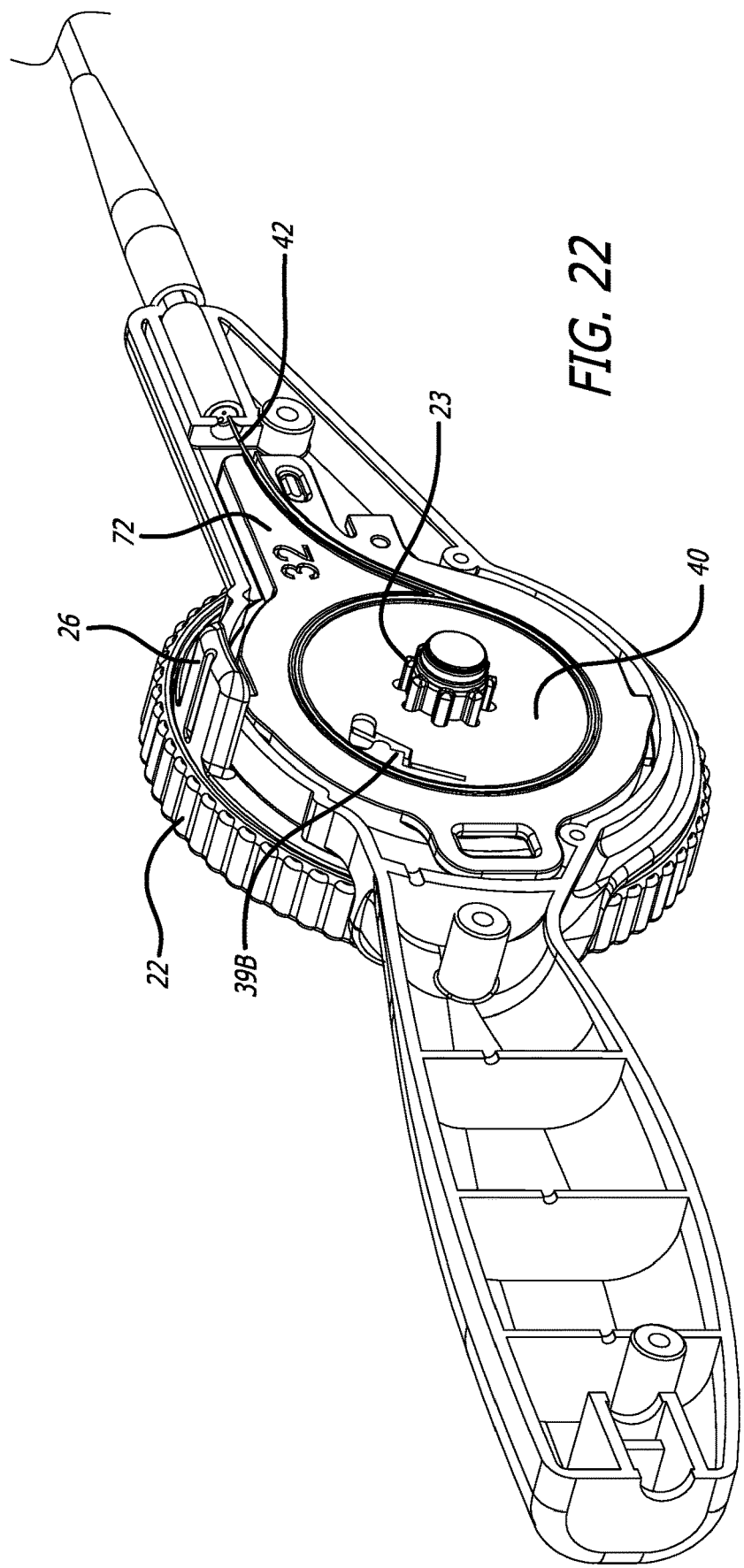
FIG. 22 is a side perspective view depicting the pusher spool mounted in the handle base and the guide path for the pusher wire.
Figure 23:
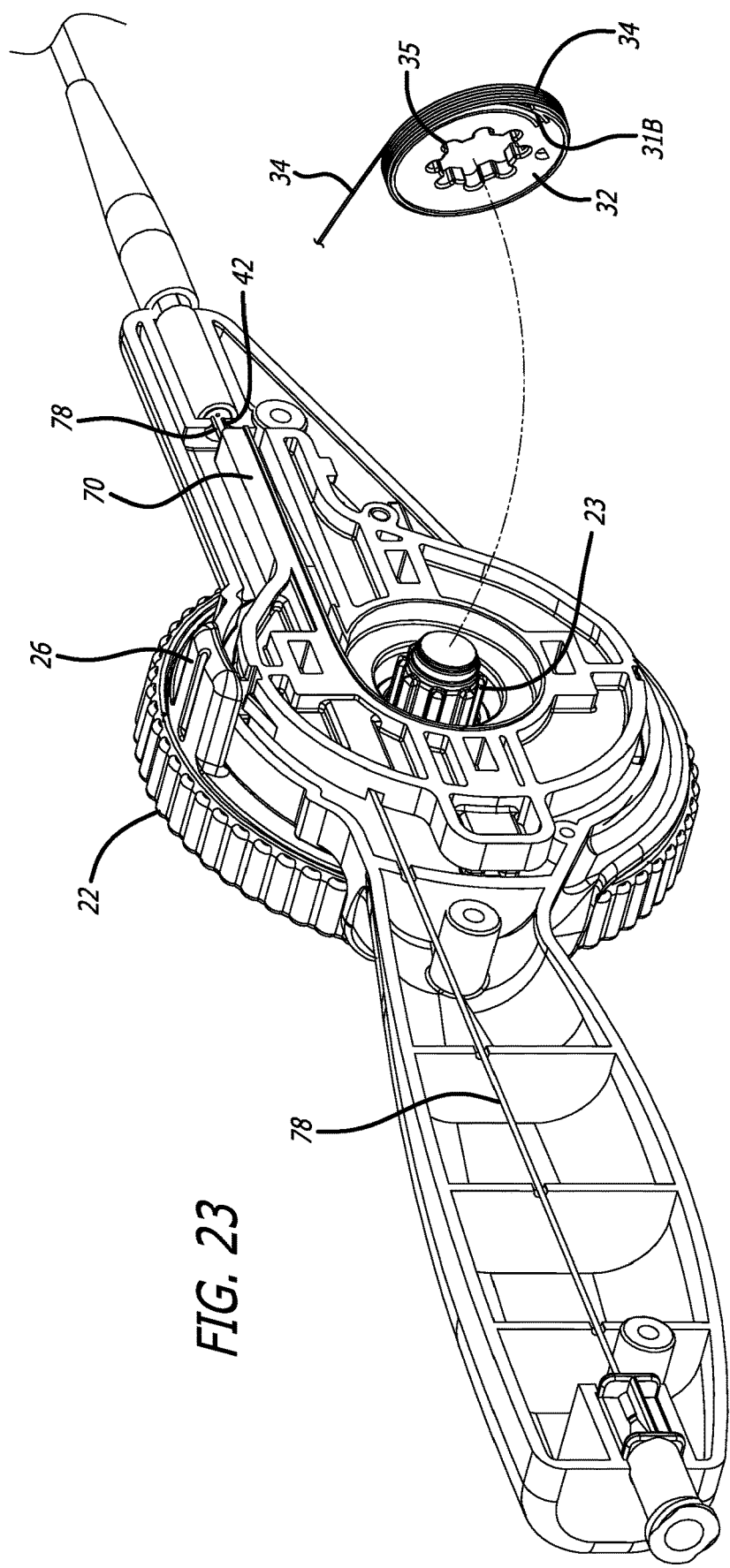
FIG. 23 is a side perspective view depicting the sheath spool of FIGS. 11A and 11B and the guide path for the sheath wire.
Figure 24:
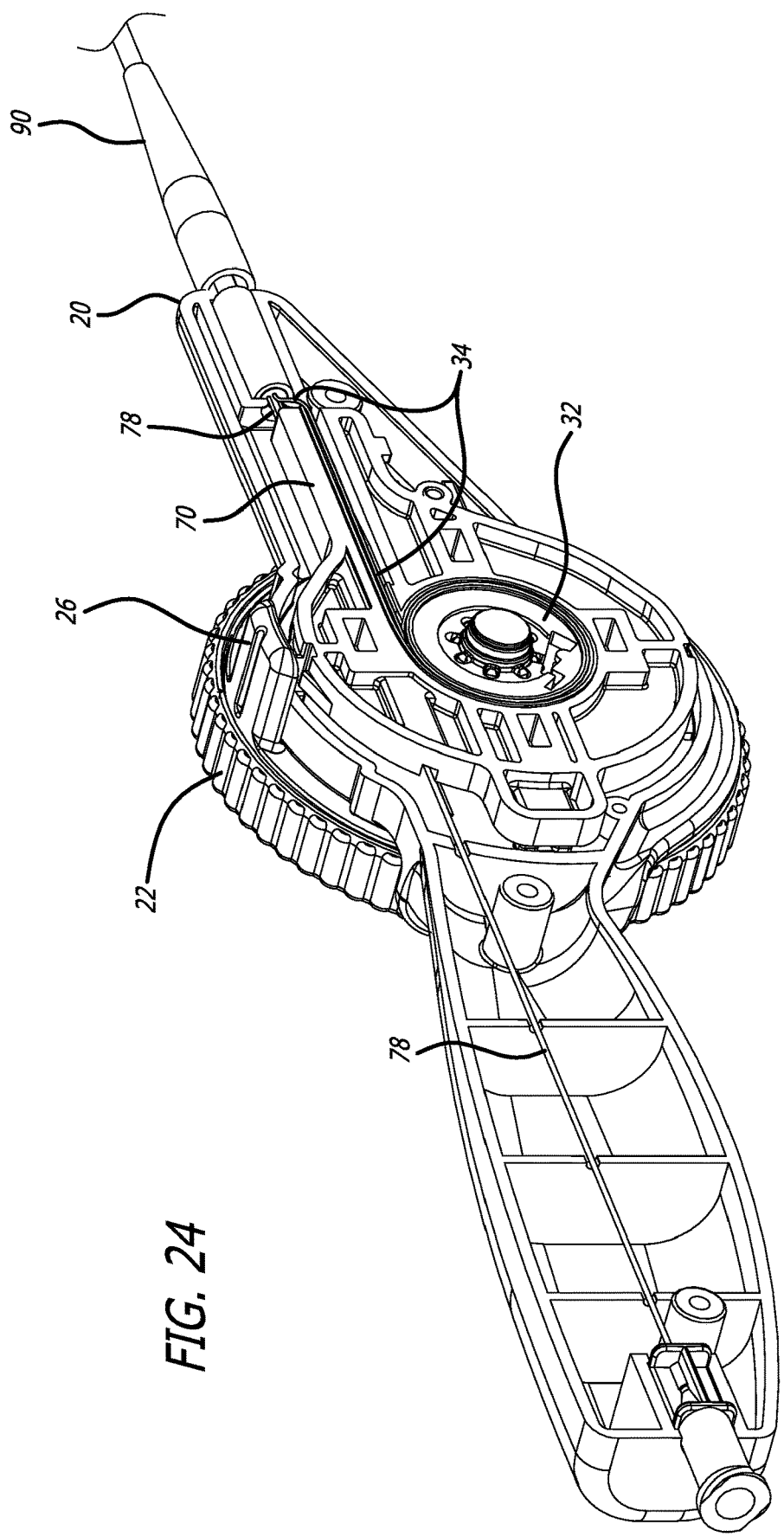
FIG. 24 is a side perspective view depicting the sheath spool mounted in the handle base and the guide path for the sheath wire.
Figure 25:
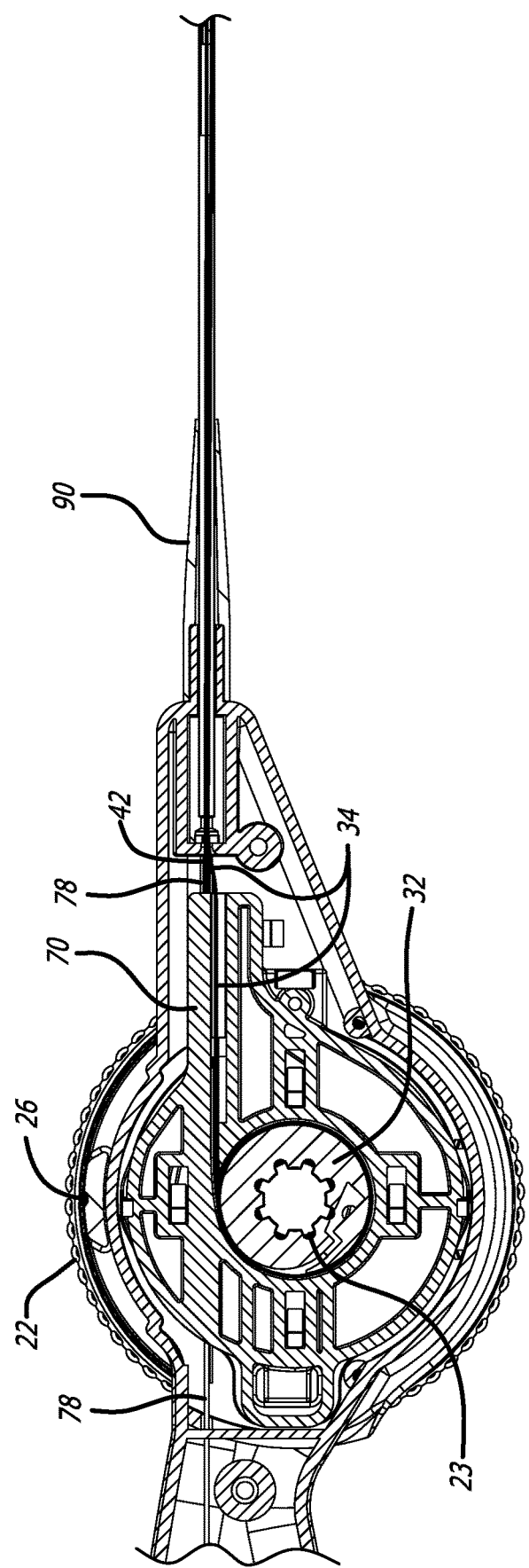
FIG. 25 is a longitudinal cross-sectional view of the handle base depicting the sheath spool and guide path of the sheath wire.
Figure 26:
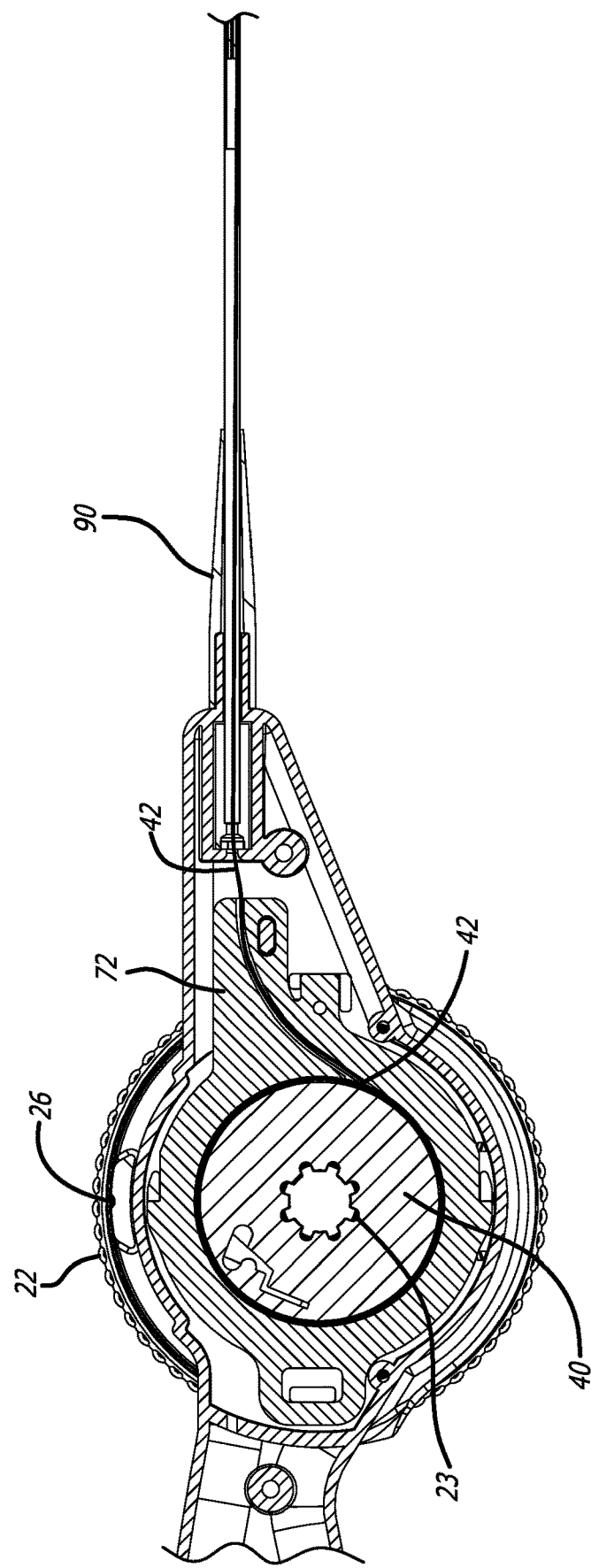
FIG. 26 is a longitudinal cross-sectional view of the handle base depicting the pusher spool and guide path of the pusher wire.

When the selector tab 26 is in a locked position 52 (FIG. 19), the first cam 54 and the second cam 56 of the selector member 24 do not contact the first ratchet member 28 and the second ratchet member 30 respectively, so that the second end 57 of the first ratchet member 28 and the second end 59 of the second ratchet member 30 each engage the inner ridges 60 and thereby prevent the thumbwheel 22 from rotating. In FIG. 19, the first spring wire 65 and the second spring wire 66 have mostly straightened and are continuously imparting a spring force on the first and second ratchet members 28, 30 respectively to keep the second ends 57, 59 firmly engaged in the inner ridges so that the thumbwheels 22 remain in a locked position 52.

When deploying and implanting the self-expanding stent 11 disclosed herein, it is important to note that in the compressed configuration mounted in the sheath 38, the self-expanding stent 11 is significantly longer than when expanded and implanted in a body lumen because of its woven wire design. Thus, when deploying and implanting the self-expanding stent 11 as shown in FIGS. 1-27B, and in particular in FIGS. 27A/27B, the ratio of the self-expanding stent 11 length when in the compressed configuration having a compressed length 86 compared to the expanded, implanted length 82, is in the range of 1.5:1 to 4:1. As an example, a self-expanding stent 11 having a compressed length 86 of 11.81 inch (300 mm) and an implanted length 82 of 3.94 inch (100 mm), would have a ratio of 3:1. In this example, for a 3.94 inch (100 mm) long self-expanding stent 11, the sheath 38 will withdraw proximally 3.94 inch (100 mm) while the pusher member 46 simultaneously advances distally 7.87 inch (200 mm) to push the self-expanding stent 11 distally out of the proximally moving sheath 38. Thus, the 3.94 inch (100 mm) movement of the sheath 38 proximally plus the 7.87 inch (200 mm) movement of the pusher member 46 distally results in an overall movement of 11.81 inch (300 mm), compared to the 3.94 inch (100 mm) of the implanted length 82, providing the ratio of 3:1. It is critically important to simultaneously move the pusher member 46 distally and push the self-expanding stent 11 out of sheath 38 and move the sheath 38 proximally, because as the self-expanding stent 11 exits the sheath 38 it immediately self-expands into contact with the vessel wall. This procedure ensures that the self-expanding stent 11 will be implanted in the exact part of the vessel selected by the physician. It is further a critically important feature of the disclosed embodiments that the physician can use only one hand on the handle assembly 12 and that the handle assembly 12 can remain stationary relative to the patient during delivery and deployment of the self-expanding stent 11. In some circumstances, it might be desirable for the physician to move the handle assembly 12 distally or proximally during delivery to shorten or lengthen the delivered stent. A stationary handle assembly 12 during delivery will yield a nominal length deployed self-expanding stent 11. Distal movement of the handle assembly 12 during deployment shortens the deployed length of the self-expanding stent, and proximal movement of the handle assembly 12 during deployment lengthens the deployed length of the self-expanding stent.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

Although certain delivery systems have been described herein in connection with a self-expanding stent, the delivery systems described herein can be used to deliver self-expanding stents or balloon expandable stents having any configuration (e.g., woven, laser cut, or non-plain woven) and constructed from any material (e.g., metal or polymer). For example, in some embodiments, the stent can include a plurality of biodegradable filaments (e.g., made from polyglycolic acid, poly-L-lactic acid, polyorthester, polyanhydride, polyiminocarbonate, or calcium phosphate) woven together to form a self-expanding stent. In some embodiments, the stent can be coated with a drug or the strands can incorporate the drug.

As used herein, the relative terms "proximal" and "distal" shall be defined from the perspective of the delivery system. Thus, proximal refers to the direction of the handle portion of the delivery system and distal refers to the direction of the distal tip.

Although certain embodiments and examples have been described herein, it will be understood by those skilled in the art that many aspects of the delivery systems shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

The methods disclosed herein may include certain actions taken by a practitioner; however, the methods can also include any third-party instruction of those actions, either expressly or by implication. For example, actions such as "advancing the self-expanding stent" include "instructing advancing the self-expanding stent."

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±1%, ±5%, ±10%, ±15%, etc.). For example, "about 0.01 inches" includes "0.01 inches." Phrases preceded by a term such as "substantially" include the recited phrase and should be interpreted based on the circumstances (e.g., as much as reasonably possible under the circumstances). For example, "substantially linear" includes "linear."

In some embodiments, the method involves delivery of a stent into an anatomical structure, and in which the device used to accomplish the method is in a desired location within a patient to start the stent advancement, the movement (e.g., the ratcheting movement) of the thumbwheel can begin such that the distal end of the stent (which can also be provided with one or more radiopaque markers to enable easier viewing of its position during the procedure) exits the sheath of the device, but not to such an extent that it expands to contact the anatomical structure. For example, during deployment, up to the last 10 mm of the stent can be deployed and the stent can still be recovered and withdrawn into the sheath. If the distal end of the stent is proximal of where the operator wants it, the stent can be pulled proximally to resheath the stent and reposition the device; if the stent is distal of where the operator wants it, the entire device can be withdrawn proximally and the deployment process continued.

The features of the devices described herein can be made from commercially-available, medical-grade materials. The sheath 38 may comprise a braided polyether block amide (e.g., comprising a braided Pebax® resin). The handle top 14 and handle base 16 may comprise acrylonitrile butadiene styrene (ABS) plastic, polycarbonate, Delrin® acetal resin (available from DuPont®), and the like. The catheter shaft 12 may comprise a polyimide (or, a series of shafts comprise from polyimide or a hypotube comprising nickel-titanium alloy). Furthermore, steps may be taken to reduce the friction between the parts that contact or may contact either other during use of the present devices, such as contact between the stent and the sheath.

The devices described herein may be used to deliver self-expending stents that are woven, including stents woven from multiple strands, such as wires. Some examples of weaving techniques that may be used include those in U.S. Pat. Nos. 6,792,979 and 7,048,014, which are each incorporated herein by reference in their entirety. The strands of a woven stent may terminate in strand ends (e.g., wire ends) that are then joined together using small segments of material, such as nitinol hypotube, when the stent strands are wires made from nitinol. The stent may be passivated through any suitable technique in order to remove the oxide layer from the stent surface that can be formed during any heat treating and annealing, thus improving the surface finish and corrosion resistance of the stent material.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those having ordinary of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Thus, it is intended that the scope of the invention herein disclosed should not be limited by the particular embodiments described above.

I claim:

1. A handle assembly for delivering and implanting a self-expanding stent in a body lumen, comprising:
    a handle having a thumbwheel and a selector tab for selecting rotation of the thumbwheel;
    a selector member pivotally mounted inside of the thumbwheel and attached to the selector tab;
    a first ratchet member and a second ratchet member pivotally mounted inside of the thumbwheel so that the selector member can be rotated to engage either or neither of the first ratchet member and the second ratchet member;
    a sheath spool mounted in the handle and having a sheath wire wound thereon, a distal end of the sheath wire being attached to a sheath;
    a pusher spool mounted in the handle and having a pusher wire wound thereon, a distal end of the pusher wire being attached to a pusher member;
    a self-expanding stent mounted inside a distal portion of the sheath and being positioned distally of the pusher member;
    wherein with the selector tab moved to a forward position on the handle, the selector member pivots into contact with the second ratchet member which in turn pivots to disengage from the thumbwheel so that the thumbwheel can only rotate in a forward direction thereby simultaneously withdrawing the sheath proximally and pushing the pusher member distally to push the self-expanding stent distally to implant the self-expanding stent in the body lumen.

2. The handle assembly of claim 1, wherein the pusher spool and the sheath spool are configured to rotate in the same direction as the thumbwheel.

3. The handle assembly of claim 2, wherein with the selector tab positioned in the forward position, the pusher spool rotates in the forward direction when the thumbwheel is rotating in the forward direction.

4. The handle assembly of claim 3, wherein the distal end of the pusher wire is attached to the pusher member so that as the pusher spool rotates in the forward direction, the pusher wire advances distally to advance the pusher member distally and hence to push the self-expanding stent distally.

5. The handle assembly of claim 4, wherein the pusher wire is wound around the pusher spool during assembly and the pusher wire unwinds from the pusher spool when the pusher spool rotates in the forward direction.

6. The handle assembly of claim 2, wherein with the selector tab positioned in the forward position, the sheath spool rotates in the forward direction when the thumbwheel is rotating in the forward direction.

7. The handle assembly of claim 6, wherein a distal end of the sheath wire is attached to the sheath member so that as the sheath spool rotates in the forward direction, the sheath wire withdraws proximally to pull the sheath proximally and hence to deploy the self-expanding stent.

8. The handle assembly of claim 7, wherein the sheath wire is wound around the sheath spool during assembly and the sheath wire winds onto the sheath spool when the sheath spool rotates in the forward direction.

9. The handle assembly of claim 1, wherein the selector member has a first cam and a second cam.

10. The handle assembly of claim 9, wherein with the selector tab moved to the forward position, the selector member pivots so that the second cam contacts a second cam surface on the second ratchet member to pivot the second ratchet member to disengage from the thumbwheel.

11. The handle assembly of claim 10, wherein a second end of the second ratchet member disengages from inner ridges spaced along an inner circumferential surface of the thumbwheel.

12. The handle assembly of claim 11, wherein the second end disengages from the inner ridges of the thumbwheel so that the thumbwheel can only rotate in the forward direction.

13. The handle assembly of claim 9, wherein with the selector tab moved to a reverse position, the selector member pivots so that the first cam contacts a first cam surface on the first ratchet member to pivot the first ratchet member to disengage from the thumbwheel.

14. The handle assembly of claim 13, wherein a second end of the first ratchet member disengages from inner ridges spaced along an inner circumferential surface of the thumbwheel.

15. The handle assembly of claim 14, wherein the second end disengages from the inner ridges of the thumbwheel so that the thumbwheel can only rotate in the reverse direction.

16. The handle assembly of claim 9, wherein with the selector tab in a locked position, the first cam and the second cam of the selector member do not contact the first ratchet member and the second ratchet member respectively so that a second end of the first ratchet member and a second end of the second ratchet member each engage inner ridges spaced along an inner circumferential surface of the thumbwheel and thereby prevent the thumbwheel from rotating.

17. The handle assembly of claim 1, wherein the sheath spool is mounted in a sheath containment cup.

18. The handle assembly of claim 17, wherein the sheath containment cup has a flange to assist in retaining the sheath wire on the sheath spool.

19. The handle assembly of claim 1, wherein the pusher spool is mounted in a pusher containment cup.

20. The handle assembly of claim 19, wherein the pusher containment cup has a flange to assist in retaining the pusher wire on the pusher spool.

21. The handle assembly of claim 1, wherein the sheath spool has a first sheath spool diameter and the pusher spool has a first pusher spool diameter.

22. The handle assembly of claim 21, wherein the first pusher spool diameter is any of greater than, smaller than, or equal to the first sheath spool diameter.

23. The handle assembly of claim 22, wherein the first pusher spool diameter is in the range from 0.39 inch to 2.0 inch and the first sheath spool diameter is in the range from 0.39 inch to 2.0 inch.

24. The handle assembly of claim 1, wherein a stabilizer is fixedly attached to a distal end of the handle.

25. The handle assembly of claim 24, wherein the stabilizer has a stabilizer lumen sized for slidably receiving the sheath.

26. A handle assembly for delivering and implanting a self-expanding stent in a body lumen, comprising:
   a handle having a handle top and a handle base and a thumbwheel attached to the handle base;
   a selector member pivotally mounted inside of the thumbwheel and attached to a selector tab;
   a first ratchet member and a second ratchet member both pivotally mounted inside of the thumbwheel so that the selector member can be rotated to engage either or neither of the first ratchet member and the second ratchet member;
   a sheath spool mounted in the handle and having a sheath wire wound thereon, a distal end of the sheath wire being attached to a sheath;
   a pusher spool mounted in the handle and having a pusher wire wound thereon, a distal end of the pusher wire being attached to a pusher member;
   a self-expanding stent mounted inside a distal portion of the sheath and being positioned distally of the pusher member;
   wherein with the selector tab moved to a forward position on the handle, the selector member pivots into contact with the second ratchet member which in turn pivots to disengage from the thumbwheel so that the thumbwheel can only rotate in a forward direction thereby simultaneously withdrawing the sheath proximally and pushing the pusher member distally to push the self-expanding stent distally to implant the self-expanding stent in the body lumen.

27. The handle assembly of claim 26, wherein the thumbwheel, the pusher spool and the sheath spool are all mounted on a splined hub and are configured to all rotate in the same direction.

28. The handle assembly of claim 27, wherein with the selector tab positioned in the forward position, the pusher spool rotates in a forward direction when the thumbwheel is rotating in the forward direction.

29. The handle assembly of claim 28, wherein the distal end of the pusher wire is attached to the pusher member so that as the pusher spool rotates in the forward direction, the pusher wire advances distally to advance the pusher member distally and hence to push the self-expanding stent distally.

30. The handle assembly of claim 29, wherein the pusher wire is wound around the pusher spool during assembly and the pusher wire unwinds from the pusher spool when the pusher spool rotates in the forward direction.

31. The handle assembly of claim 27, wherein with the selector tab positioned in the forward position, the sheath spool rotates in the forward direction when the thumbwheel is rotating in the forward direction.

32. The handle assembly of claim 31, wherein a distal end of the sheath wire is attached to the sheath member so that as the sheath spool rotates in the forward direction, the sheath wire withdraws proximally to pull the sheath proximally and hence to deploy the self-expanding stent.

33. The handle assembly of claim 32, wherein the sheath wire is wound around the sheath spool during assembly and the sheath wire winds onto the sheath spool when the sheath spool rotates in the forward direction.

34. The handle assembly of claim 26, wherein the selector member has a first cam and a second cam.

35. The handle assembly of claim 34, wherein with the selector tab moved to the forward position, the selector member pivots so that the second cam contacts a second cam surface on the second ratchet member to pivot the second ratchet member to disengage from the thumbwheel.

36. The handle assembly of claim 35, wherein a second end of the second ratchet member disengages from inner ridges spaced along an inner circumferential surface of the thumbwheel.

37. The handle assembly of claim 36, wherein the second end disengages from the inner ridges of the thumbwheel so that the thumbwheel can only rotate in the forward direction.

38. The handle assembly of claim 34, wherein with the selector tab moved to a reverse position, the selector member pivots so that the first cam contacts a first cam surface on the first ratchet member to pivot the first ratchet member to disengage from the thumbwheel.

39. The handle assembly of claim 38, wherein a second end of the first ratchet member disengages from inner ridges spaced along an inner circumferential surface of the thumbwheel.

40. The handle assembly of claim 39, wherein the second end disengages from the inner ridges of the thumbwheel so that the thumbwheel can only rotate in the reverse direction.

41. The handle assembly of claim 34, wherein with the selector tab in a locked position, the first cam and the second cam of the selector member do not contact the first ratchet member and the second ratchet member respectively so that a second end of the first ratchet member and a second end of the second ratchet member each engage inner ridges spaced along an inner circumferential surface of the thumbwheel and thereby prevent the thumbwheel from rotating.

42. The handle assembly of claim 26, wherein the sheath spool is mounted in a sheath containment cup.

43. The handle assembly of claim 42, wherein the sheath containment cup has a flange to assist in retaining the sheath wire on the sheath spool.

44. The handle assembly of claim 26, wherein the pusher spool is mounted in a pusher containment cup.

45. The handle assembly of claim 44, wherein the pusher containment cup has a flange to assist in retaining the pusher wire on the pusher spool.

46. The handle assembly of claim 26, wherein the sheath spool has a first sheath spool diameter and the pusher spool has a first pusher spool diameter.

47. The handle assembly of claim 46, wherein the first pusher spool diameter is any of greater than, equal to, or smaller than the first sheath spool diameter.

48. The handle assembly of claim 47, wherein the first pusher spool diameter is in the range from 0.39 inch to 2.00 inch and the first sheath spool diameter is in the range from 0.39 inch to 2.00 inch.

49. The handle assembly of claim 26, wherein a stabilizer is fixedly attached to a distal end of the handle.

50. The handle assembly of claim 49, wherein the stabilizer has a stabilizer lumen sized for slidably receiving the sheath.

51. A method for delivering and implanting a self-expanding stent in a body lumen, comprising:
providing a handle assembly having a handle, a thumbwheel, and a selector tab for selecting rotation of the thumbwheel;
pivotally mounting a selector member inside of the thumbwheel and attaching the selector tab to the selector member;
pivotally mounting a first ratchet member and a second ratchet member inside of the thumbwheel so that the selector member can be rotated to actuate either or neither of the first ratchet member and the second ratchet member;
mounting a sheath spool on a splined hub on the handle and winding a sheath wire on the sheath spool, and attaching a distal end of the sheath wire to a sheath;
mounting a pusher spool on the splined hub on the handle and winding a pusher wire on the pusher spool, and attaching a distal end of the pusher wire to a pusher member;
mounting a self-expanding stent inside of the sheath and positioning the self-expanding stent distally of the pusher member;
wherein by moving the selector tab to a forward position on the handle, the selector member pivots into contact with the second ratchet member which in turn pivots to disengage from the thumbwheel so that the thumbwheel can only rotate in a forward direction; and
rotating the thumbwheel in a forward direction and thereby simultaneously withdrawing the sheath proximally and pushing the pusher member distally to push the self-expanding stent distally out of the sheath to implant the self-expanding stent in the body lumen.

52. The method of claim 51, wherein the thumbwheel, the pusher spool and the sheath spool rotate in the same direction.

53. The method of claim 52, wherein with the selector tab pushed to the forward position, the pusher spool rotates in a forward direction when the thumbwheel is rotating in the forward direction.

54. The method of claim 53, wherein attaching the distal end of the pusher wire to the pusher member so that as the pusher spool rotates in the forward direction, the pusher wire advances distally to advance the pusher member distally and hence to push the self-expanding stent distally.

55. The method of claim 54, wherein the pusher wire is wound around the pusher spool during assembly and the pusher wire unwinds from the pusher spool when the pusher spool rotates in the forward direction.

56. The method of claim 52, wherein with the selector tab pushed to the forward position, the sheath spool rotates in a forward direction when the thumbwheel is rotating in the forward direction.

57. The method of claim 56, wherein attaching a distal end of the sheath wire to the sheath member so that as the sheath spool rotates in the forward direction, the sheath wire withdraws proximally to pull the sheath proximally and hence to deploy the self-expanding stent.

58. The method of claim 57, wherein the sheath wire is wound around the sheath spool during assembly and the sheath wire winds onto the sheath spool when the sheath spool rotates in the forward direction.

59. The method of claim 51, wherein moving the selector tab to the forward position pivots the selector member so that a second cam contacts a second cam surface on the second ratchet member to pivot the second ratchet member to disengage from the thumbwheel.

60. The method of claim 59, wherein when rotating the thumbwheel in the forward direction, a second end of the second ratchet member disengages from inner ridges spaced along an inner circumferential surface of the thumbwheel.

61. The method of claim 60, wherein the second end disengages from the inner ridges of the thumbwheel so that the thumbwheel can only rotate in the forward direction.

62. The method of claim 61, wherein moving the selector tab to the forward position pivots the selector member so that the selector member does not contact the first ratchet member and a second end of the first ratchet member continues to engage the inner ridges of thumbwheel so that the thumbwheel can only rotate in the forward position.

63. The method of claim 51, wherein moving the selector tab to a reverse position pivots the selector member so that a first cam on the selector member contacts a second cam surface on the first ratchet member to pivot the first ratchet member to disengage from the thumbwheel.

64. The method of claim 63, wherein when rotating the thumbwheel in a reverse direction, a second end of the first ratchet member disengages from inner ridges spaced along an inner circumferential surface of the thumbwheel.

65. The method of claim 64, wherein the second end disengages from the inner ridges of the thumbwheel so that the thumbwheel can only rotate in the reverse direction.

66. The method of claim 51, wherein with the selector tab moved to a locked position, the first cam and the second cam of the selector member do not contact the first ratchet member and the second ratchet member respectively, so that a second end of the first ratchet member and a second end of the second ratchet member each engage inner ridges spaced along an inner circumferential surface of the thumbwheel and thereby prevent the thumbwheel from rotating.

67. The method of claim 51, wherein mounting the sheath spool in a sheath containment cup.

68. The method of claim 67, wherein the sheath containment cup has a flange to assist in returning the sheath wire on the sheath spool.

69. The method of claim 51, wherein mounting the pusher spool in a pusher containment cup.

70. The method of claim 69, wherein the pusher containment cup has a flange to assist in retaining the pusher wire on the pusher spool.

71. The method of claim 51, wherein fixedly attaching a stabilizer to a distal end of the handle.

72. The method of claim 71, wherein the stabilizer has a stabilizer lumen sized for slidably receiving the sheath.

* * * * *